United States Patent
Ohmuro et al.

(10) Patent No.: US 7,768,606 B2
(45) Date of Patent: Aug. 3, 2010

(54) LIQUID CRYSTAL DISPLAY DEVICE AND MANUFACTURING METHOD FOR THE SAME

(75) Inventors: Katsufumi Ohmuro, Kawasaki (JP); Norio Sugiura, Kawasaki (JP); Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 182 days.

(21) Appl. No.: 11/708,198

(22) Filed: Feb. 20, 2007

(65) Prior Publication Data

US 2007/0146589 A1 Jun. 28, 2007

Related U.S. Application Data

(62) Division of application No. 10/701,305, filed on Nov. 4, 2003, now Pat. No. 7,209,107.

(30) Foreign Application Priority Data

Nov. 6, 2002 (JP) ............................... 2002-323073
Nov. 29, 2002 (JP) ............................... 2002-347077

(51) Int. Cl.
*G02F 1/1335* (2006.01)
(52) U.S. Cl. ...................................... 349/114; 349/113
(58) Field of Classification Search ................. 349/113, 349/114, 122, 138, 139, 143
See application file for complete search history.

(56) References Cited

U.S. PATENT DOCUMENTS

| 4,712,874 | A | 12/1987 | Sekimura et al. |
|---|---|---|---|
| 5,177,627 | A | 1/1993 | Ishiwata et al. |
| 5,418,635 | A | 5/1995 | Mitsui et al. |
| 5,708,486 | A | 1/1998 | Miyawaki et al. |
| 5,724,111 | A | 3/1998 | Mizobata et al. |
| 5,753,937 | A | 5/1998 | Shimomaki et al. |
| 5,847,789 | A | 12/1998 | Nakamura et al. |
| 5,850,274 | A | 12/1998 | Shin et al. |
| 5,872,611 | A * | 2/1999 | Hirata et al. ................. 349/147 |
| 6,124,909 | A | 9/2000 | Miyashita et al. |
| 6,169,593 | B1 | 1/2001 | Kanaya et al. |

(Continued)

FOREIGN PATENT DOCUMENTS

JP          5-232465          9/1993

(Continued)

*Primary Examiner*—David Nelms
*Assistant Examiner*—David Y Chung
(74) *Attorney, Agent, or Firm*—Greer, Burns & Crain, Ltd.

(57) ABSTRACT

On a glass substrate, gate bus lines, data bus lines, and TFTs are formed. Then, on the substrate, an insulating film, covering the gate bus lines, data bus lines and TFTs, is formed, and a positive type photoresist film is further formed thereon. Next, through exposure and development processes, the resist film is divided for each picture element and subjected to ultraviolet ray irradiation to harden only a surface layer thereof. Then, the resist film is subjected to heat treatment to form thereon wrinkle-form surface ruggedness of a uniform pattern, which is determined depending on the size of the resist film. Subsequently, reflection electrodes are formed on the resist film. The reflection electrodes are formed to overlap the gate bus line, data bus line and TFTs, and the regions between the adjacent reflection electrodes serve as light transmission regions.

5 Claims, 35 Drawing Sheets

U.S. PATENT DOCUMENTS

| | | |
|---|---|---|
| 6,195,140 B1 | 2/2001 | Kubo et al. |
| 6,452,653 B1 | 9/2002 | Yamanaka et al. |
| 6,476,889 B2 | 11/2002 | Urabe et al. |
| 6,850,298 B2 * | 2/2005 | Fujimori et al. ............. 349/114 |
| 6,853,421 B2 * | 2/2005 | Sakamoto et al. ........... 349/114 |
| 7,075,603 B2 * | 7/2006 | Ihida et al. .................. 349/114 |
| 2001/0033350 A1 | 10/2001 | Kobayashi et al. |
| 2002/0075441 A1 * | 6/2002 | Fujimori et al. ............. 349/155 |
| 2002/0140886 A1 | 10/2002 | Sugiura et al. |
| 2002/0149728 A1 | 10/2002 | Ogishima et al. |
| 2003/0128317 A1 | 7/2003 | Ohmuro et al. |
| 2004/0218120 A1 | 11/2004 | Ikeno et al. |

FOREIGN PATENT DOCUMENTS

| | | |
|---|---|---|
| JP | 7-333598 | 12/1995 |
| JP | 8-338993 | 12/1996 |
| JP | 10-307205 | 11/1998 |
| JP | 11-2811 | 1/1999 |
| JP | 11-281972 | 10/1999 |
| JP | 11-305248 | 11/1999 |
| JP | 2001-166289 | 6/2001 |
| JP | 2002-221716 | 8/2002 |
| JP | 2002-296585 | 10/2002 |
| JP | 2003-202594 | 7/2003 |

* cited by examiner

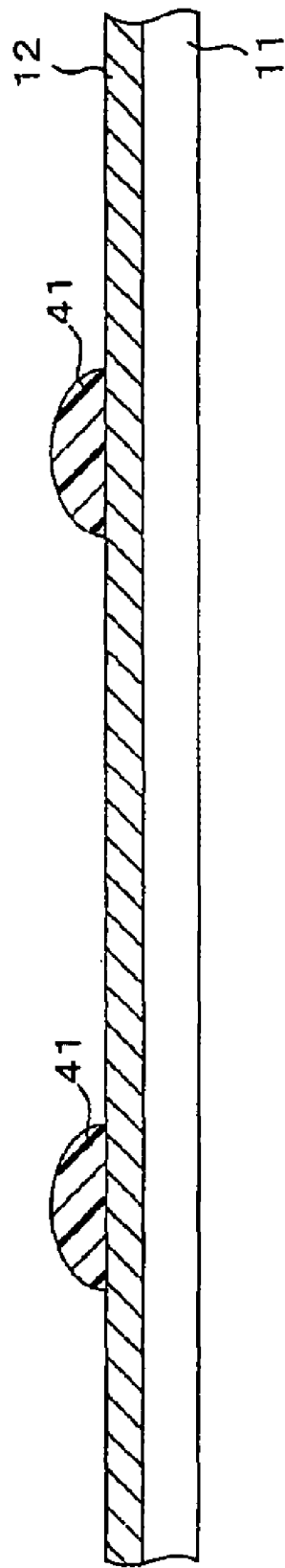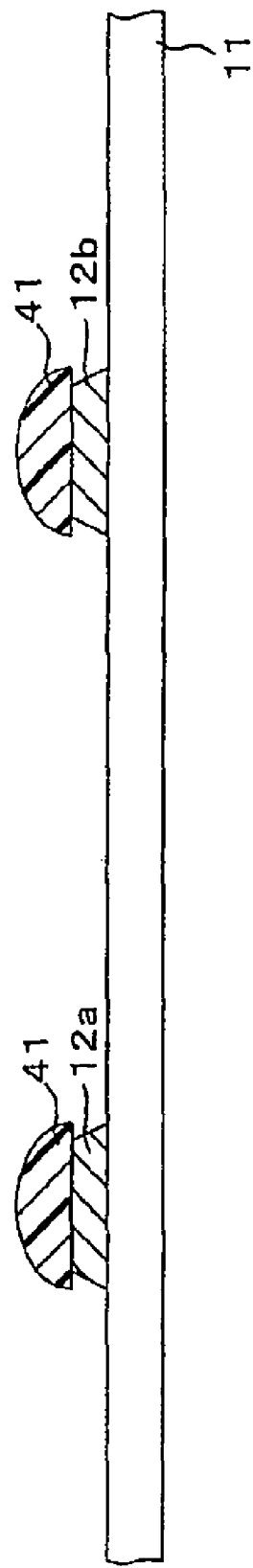

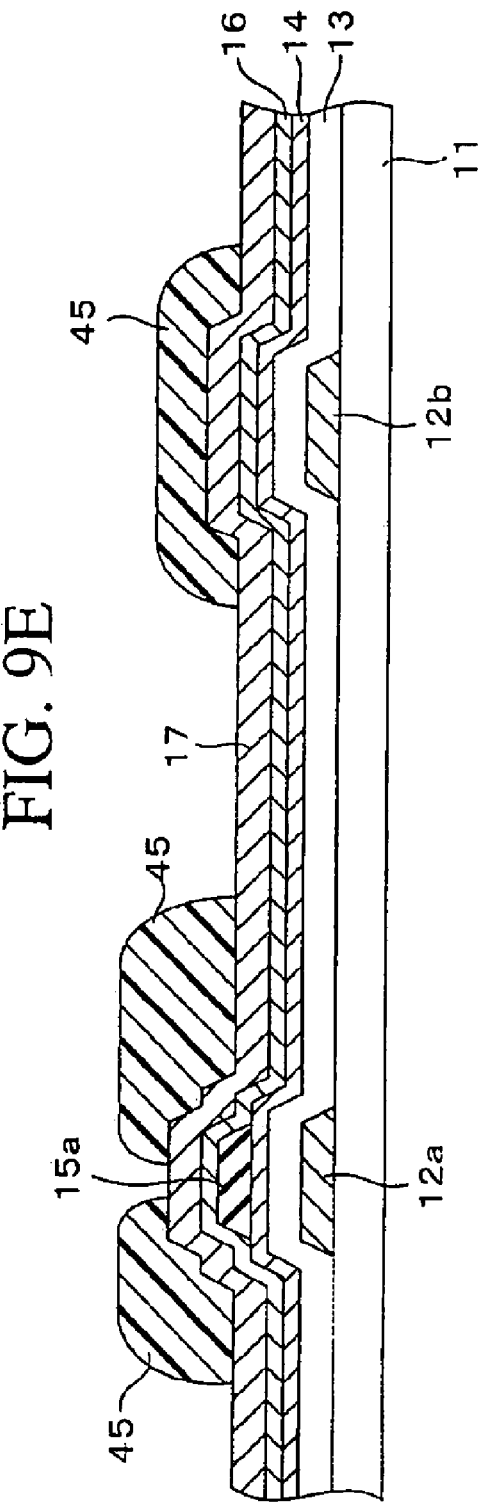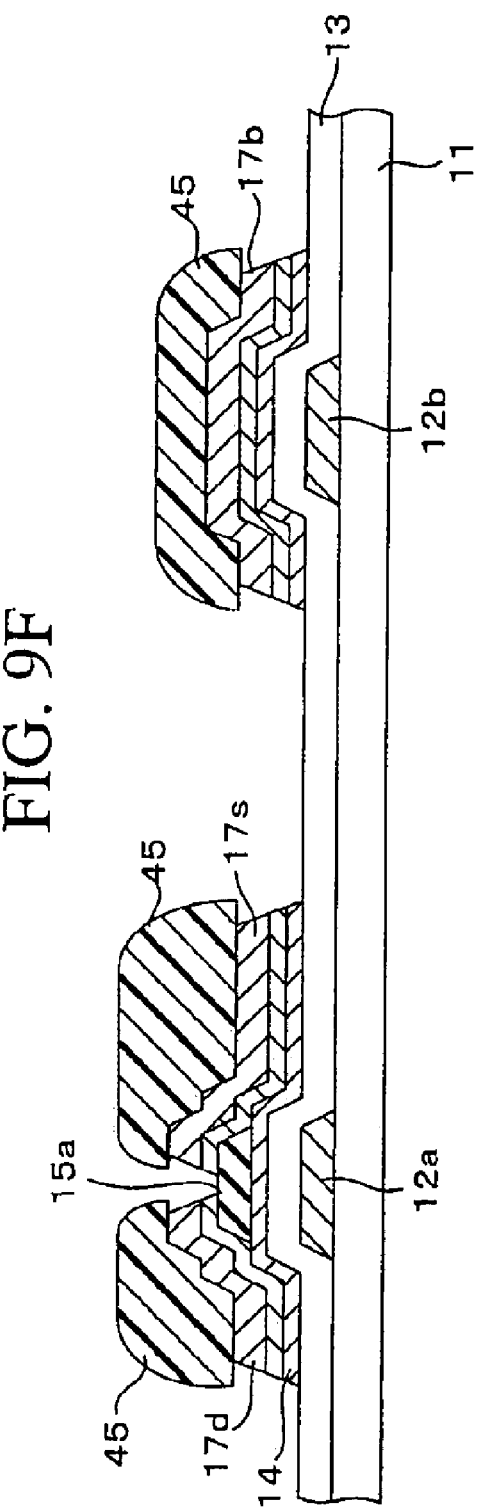

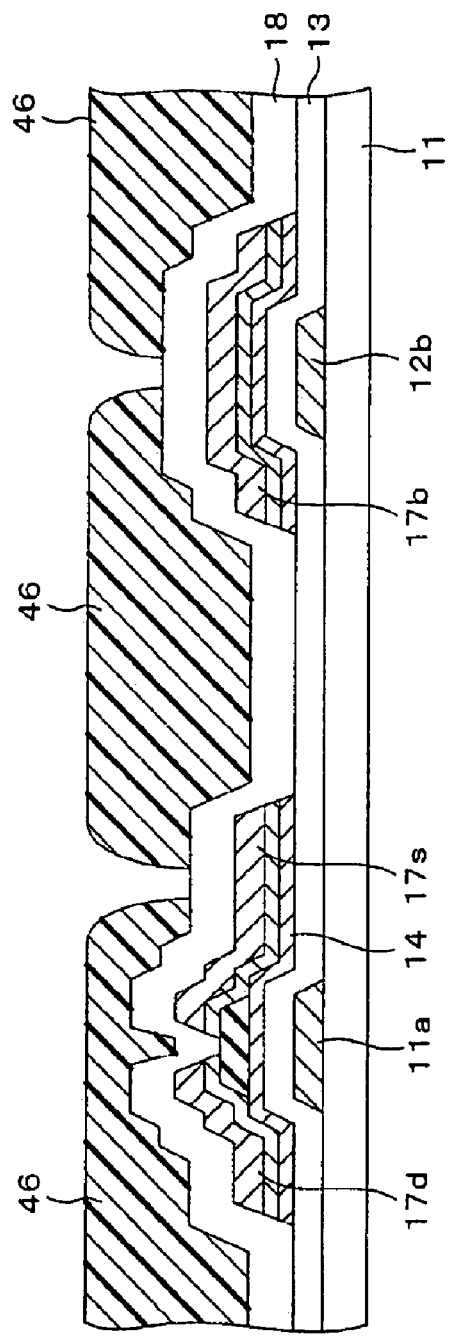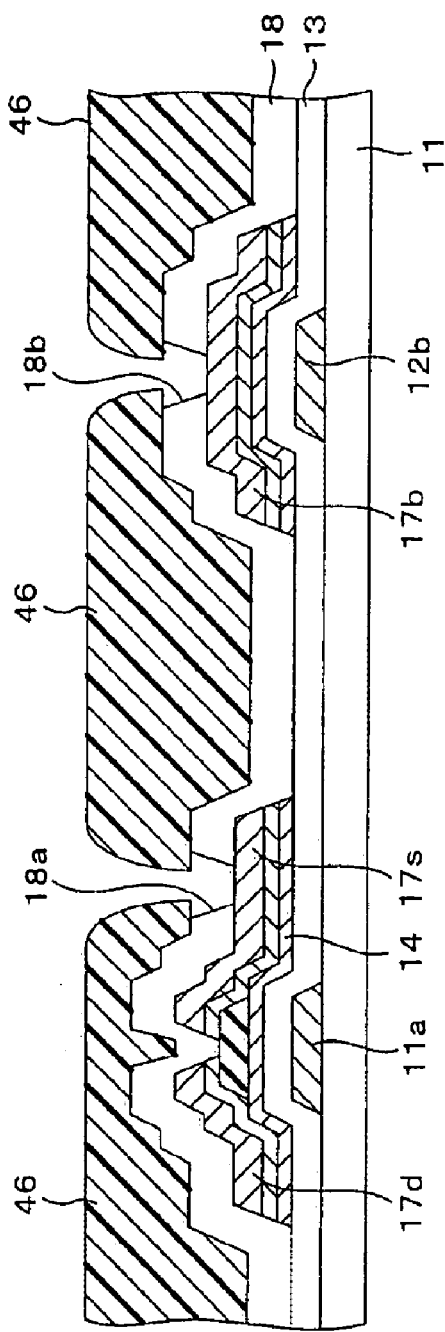

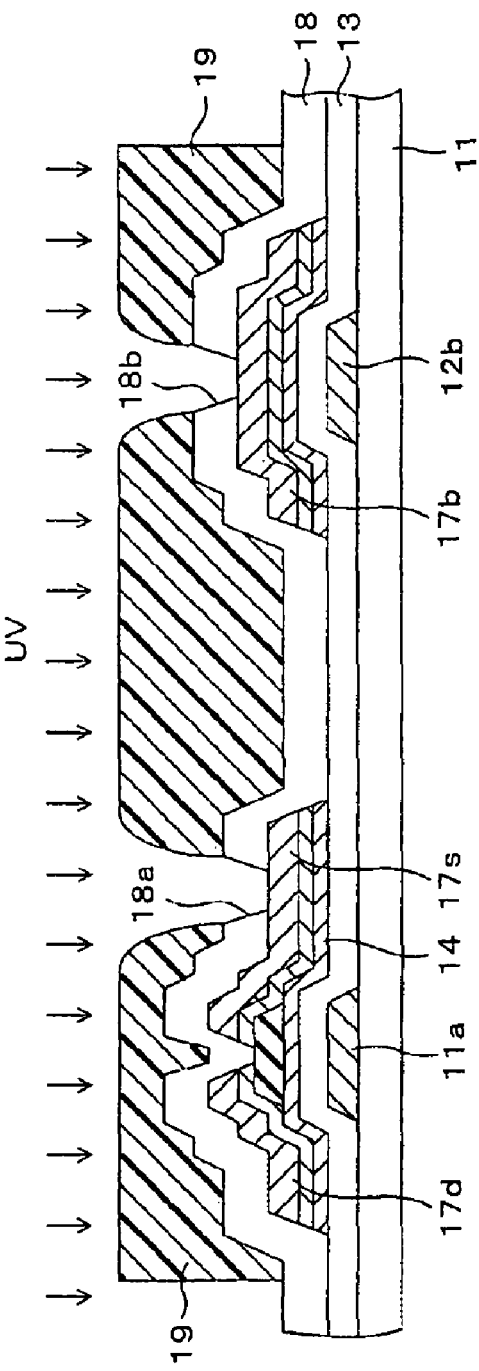

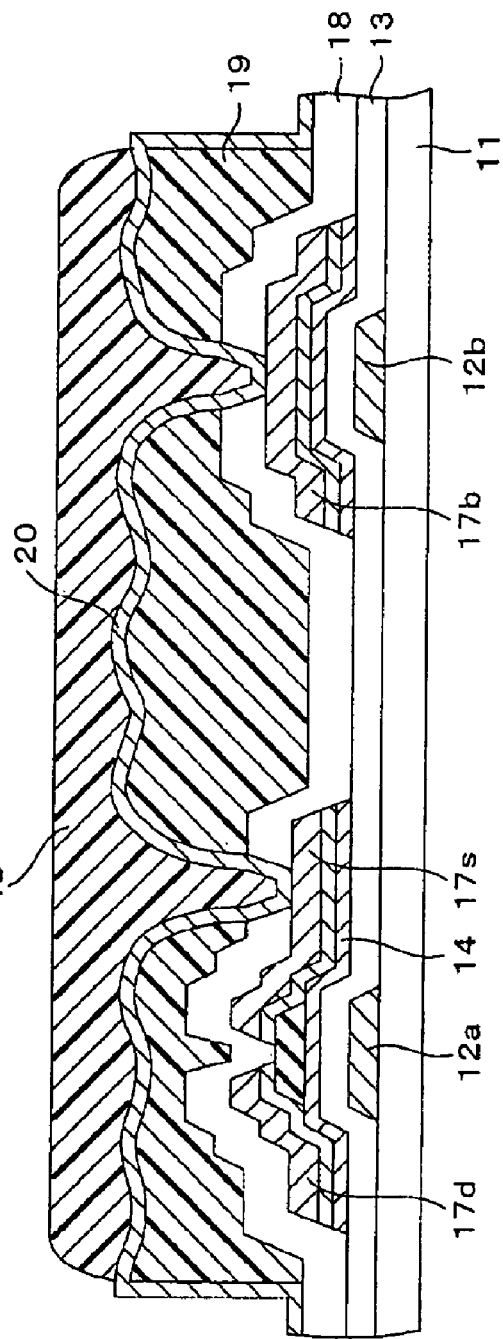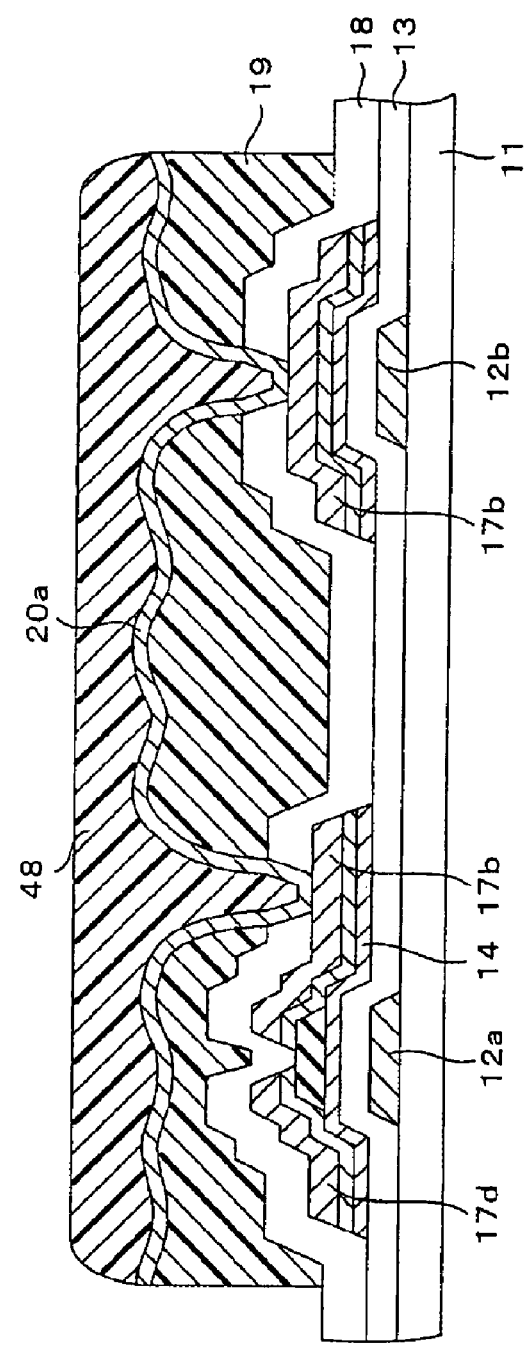

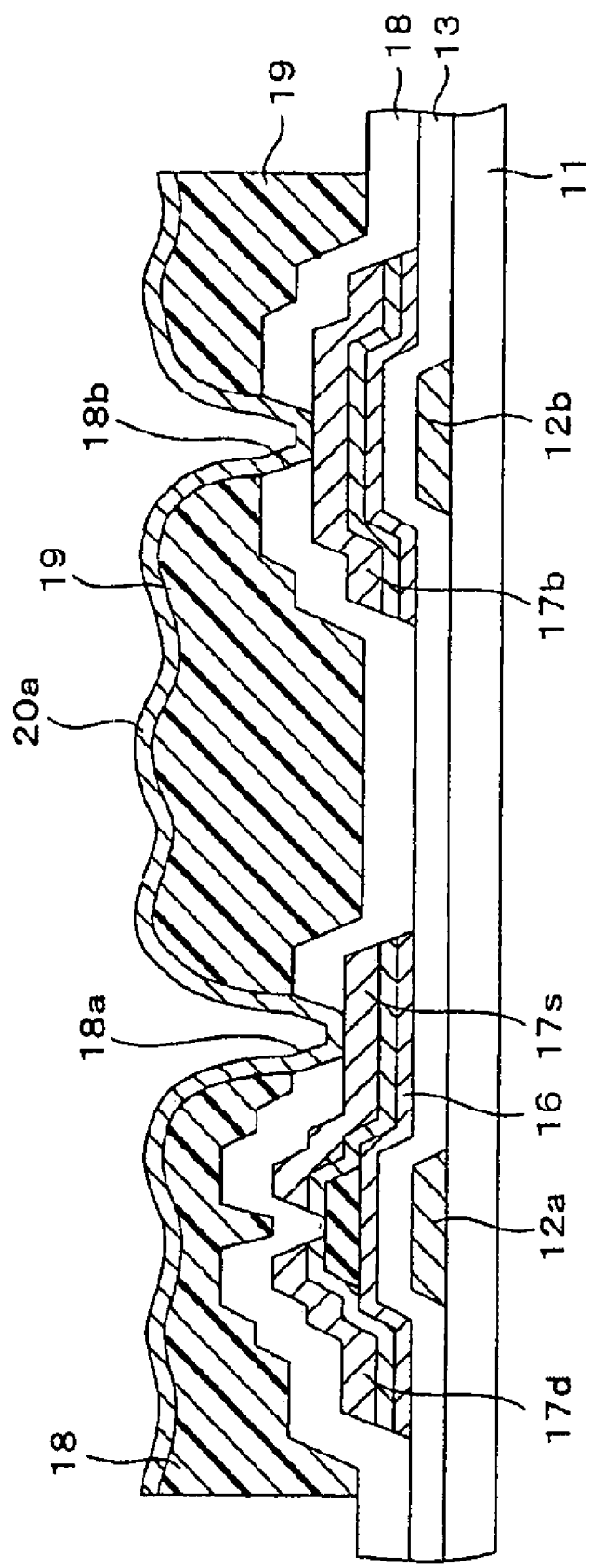

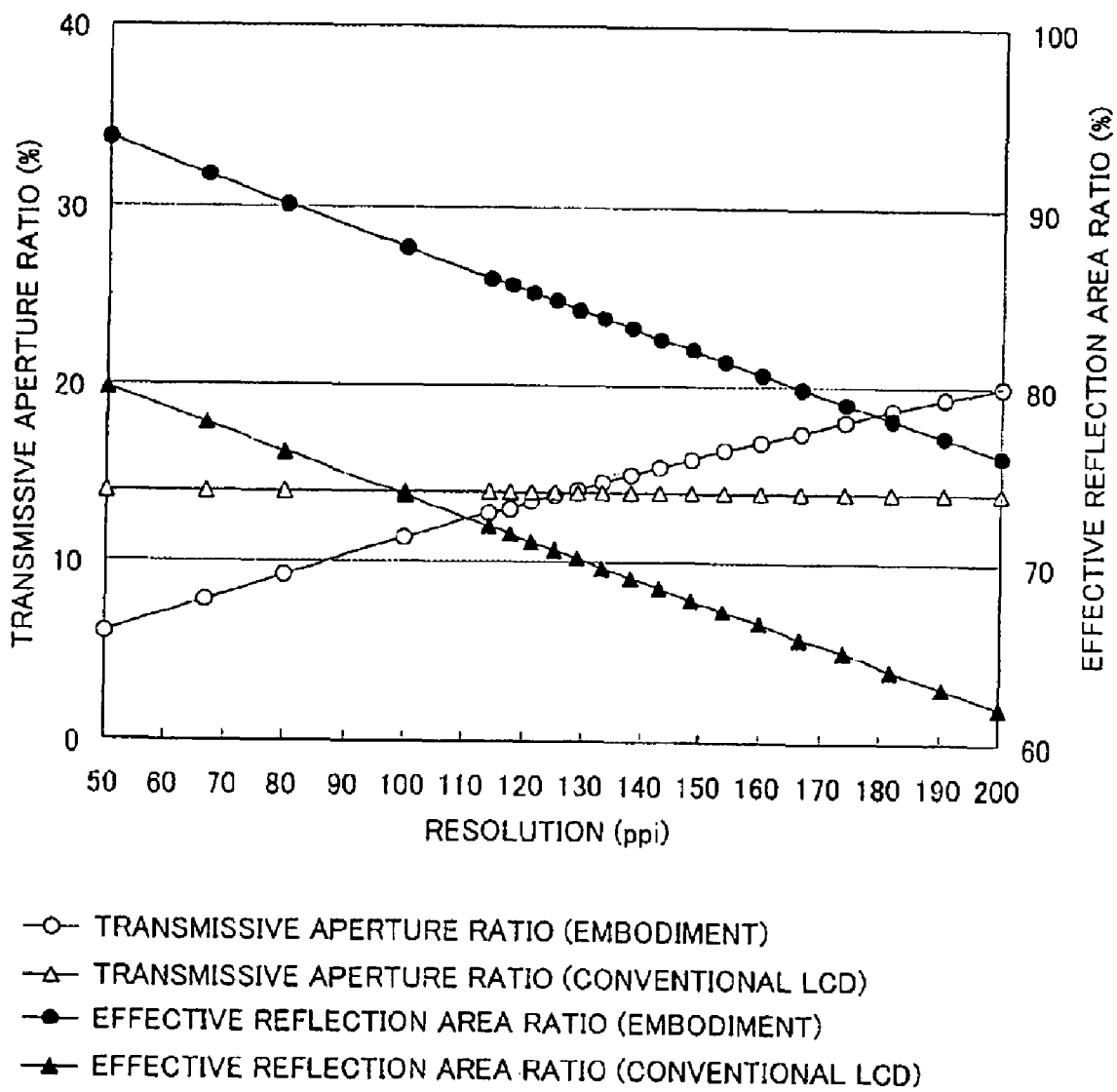

AFM IMAGE OF THE REFLECTION ELECTRODES

LIQUID CRYSTAL DISPLAY DEVICE AND MANUFACTURING METHOD FOR THE SAME

CROSS-REFERENCE TO RELATED APPLICATIONS

This is a divisional of application Ser. No. 10/701,305, filed Nov. 4, 2003 now U.S. Pat. No. 7,209,107.

This application is based upon and claims priority of Japanese Patent Applications No. 2002-347077, filed on Nov. 29, 2002, and No. 2002-323073, filed on Nov. 6, 2002, the contents being incorporated herein by reference.

BACKGROUND OF THE INVENTION

1. Field of the Invention

The present invention relates to a liquid crystal display device having a reflection electrode and a manufacturing method for the same and, more particularly, to a liquid crystal display device applicable to a transflective type liquid crystal display device which can be used as a reflection type liquid crystal display device in the environment of a bright ambient, and can be used as a transmission type liquid crystal display device by switching on a backlight in the environment of a dark ambient, and a manufacturing method for the same.

2. Description of the Prior Art

A liquid crystal display device is thin and lightweight compared with a CRT (Cathode Ray Tube), having an advantage that it can be driven with a lower voltage with low power consumption. The liquid crystal display device is used for various electronic devices such as a TV set, a notebook type personal computer, a desktop type personal computer, a PDA (Personal Digital Assistance), and a cellular telephone. Especially, an active matrix type liquid crystal display device provided with a TFT (Thin-film transistor) as a switching element for each sub-pixel (hereafter, referred to as a picture element in this invention) shows an excellent display characteristic comparable to the CRT, with its high driving capability. Therefore, the active matrix type liquid crystal display device has been extensively used for the fields where conventionally the CRT is used, such as a desktop type personal computer and a TV set.

Generally, the liquid crystal display device has a structure in which liquid crystal is enclosed between two transparent substrates. A picture element electrode, the TFT and the like are formed for each picture element on one of the two transparent substrates, and color filters disposed opposingly to the picture element electrode and a common electrode that is common to each picture element are formed on the other substrate. Hereafter, the substrate having the picture element electrode and the TFT formed thereon is referred to as a TFT substrate, and the substrate arranged opposingly to the TFT substrate is referred to as a counter substrate. Note that one pixel is formed of three picture elements (sub-pixels) of red (R), green (G) and blue (B).

The liquid crystal display device includes a transmission type liquid crystal display device and a reflection type liquid crystal display device. The transmission type liquid crystal display device displays images by controlling the light quantity of transmitted rays of light for each picture element, while the reflection type liquid crystal display device displays images by controlling the light quantity of reflected rays of light for each picture element. The transmission type liquid crystal display device requires an exclusive light source called a backlight. Meanwhile, in the reflection type liquid crystal display device, an ambient condition of light (natural light or lamplight) is used as a light source. Therefore, the reflection type liquid crystal display device has a merit of consuming much less power compared with the transmission type liquid crystal display device. In addition, the reflection type liquid crystal display device is more excellent in visibility outdoors than the transmission type liquid crystal display device. Hereafter, the picture element electrode of the reflection type liquid crystal display device is also referred to as a reflection electrode.

For example, Japanese Patent Laid-Open No. Hei 08-338993 discloses a reflection type liquid crystal display device in which a TN (twisted nematic) type liquid crystal is used and an alignment film is subjected to rubbing treatment to make the liquid crystal twist align. Moreover, Japanese Patent Laid-Open No. Hei 05-232465 discloses a liquid crystal display device whose reflection electrode is provided with ruggedness by using a photolithography method. In this way, by providing the surface of the reflection electrode with ruggedness, it is avoided that the visibility is greatly changed depending on a position where a panel is observed, by irregular reflection of light.

However, the process for forming ruggedness on the surface of the reflection electrode is complicated in the above-described method. Hereupon, the present inventors provide a method for forming a reflection electrode provided with ruggedness on the surface thereof by using a positive type photoresist (for example, Japanese Patent Laid-Opens No. 2002-221716 and No. 2002-296585). In this method, the step to harden only a surface layer is carried out by subjecting the photoresist to ultraviolet ray irradiation and followed by heat treatment. Fine ruggedness is thus formed on the surface of the resist film. Then, by forming the reflection electrode on the resist film, the reflection electrode having surface ruggedness can be easily formed.

Incidentally, in the reflection type liquid crystal display device, since an ambient condition of light (natural light or lamplight) is used as a light source, the visibility is greatly changed depending on the ambient condition of light. That is, when its neighborhood is bright, the visibility of the reflection type liquid crystal display device is satisfactory. However, when its neighborhood is dark, the visibility thereof is extremely decreased. In order to overcome such a disadvantage, the reflection type liquid crystal display device having a light source (front light unit) on a front panel surface, is proposed. However, the reflection type liquid crystal display device with this structure is formed so that the light reflected by the reflection electrode may be transmitted through the front light unit, where the reflective light is reduced. Therefore, such a reflection type liquid crystal display device poses a problem that contrast of an image is lowered and sufficient visibility is not obtained compared with the reflection type liquid crystal display device without any front light unit.

Japanese Patent Laid-Open No. Hei 07-333598 discloses a liquid crystal display device (hereafter, referred to as a transflective type liquid crystal display device) that can be used as a reflection type liquid crystal display device when its neighborhood is bright, and as a transmission type liquid crystal display device by switching on a backlight when its neighborhood is dark. This is realized by forming a reflection electrode of a metal thin film for semi-transmitting light. However, in this type of transflective type liquid crystal display device, when used as a transmission type liquid crystal display device, light absorption by the metal thin film is increased. Therefore, the utilization efficiency of light is bad, involving a problem that satisfactory visibility cannot be obtained unless a backlight having large luminance is used. Al (aluminum) film having a thickness of about 30 nm is used as the metal thin film for semi-transmitting light. However, in the case of a large-sized liquid crystal display device, it is extremely difficult to form an Al thin film having a uniform thickness over the entire surface of a panel.

Japanese Patent Laid-Open No. Hei 11-281972 discloses a transflective type liquid crystal display device in which the central part of a reflection electrode is opened to form a transmission region through which light is transmitted, and in the transmission region, a transparent electrode such as an ITO (Indium-Tin Oxide) is formed.

FIG. 1 is a schematic diagram showing an example of the TFT substrate of a conventional transflective type liquid crystal display device with the above structure.

On the TFT substrate, a plurality of gate bus lines 71 disposed so as to be parallel to each other, and a plurality of data bus lines 72 so as to be orthogonal to the gate bus lines 71, are formed. In the vicinity of each area where the gate bus line 71 and the data bus line 72 intersect with each other, a TFT 73 is formed. Moreover, in each rectangular region partitioned by the gate bus lines 71 and the data bus lines 72, a reflection electrode 74 made of a metal film for reflecting light such as Al (aluminum) is formed. In the central part of the reflection electrode 74, an opening part 74a for transmitting light is formed, and in the opening part 74a, a transparent electrode 75 made of a transparent electric conductor such as ITO is formed.

The gate bus lines 71, the data bus lines 72, and the TFTs 73 are covered with an insulating flattening film; the reflection electrodes 74 are formed on the flattening film; and the transparent electrodes 75 are formed under the flattening film. When direct contact of the Al constituting the reflection electrodes 74 and the ITO constituting the transparent electrodes 75 occurs, corrosion is caused due to a battery effect. For this reason, the reflection electrodes 74 and the transparent electrodes 75 are electrically connected via a barrier metal such as Ti (titanium).

In the liquid crystal display device with the above structure, scanning signals are sequentially supplied to a plurality of the gate bus lines 71, and display signals are supplied to each of the data bus lines 72 when displaying an image. Then, the TFTs 73 connected to the gate bus lines 71 supplied with the scanning signals become in ON states, and the display signals are written in the reflection electrodes 74 and the transparent electrodes 75 via the TFTs 73, whereby the orientation of liquid crystal molecules between the reflection electrodes 74 and the counter substrate, as well as the transparent electrodes 75 and the counter substrate, are changed. Consequently, the light quantity of the reflective light or the transmitted light is also changed. By controlling the light quantity of the reflective light or the transmitted light for each picture element, a desired image is displayed on the liquid crystal display device.

According to the transflective type liquid crystal display device, comparatively satisfactory visibility is secured in any case of using it as the reflection type display device or as the transmission type display device.

However, in the transflective type liquid crystal display device disclosed in Japanese Patent Laid-Open No. Hei 11-281972, the transparent electrodes made of ITO and the barrier metal are required to be formed in addition to the reflection electrodes made of Al. Accordingly, there arises a problem that many processes are required, involving an increase in product costs.

Furthermore, in this transflective type liquid crystal display device, if the transmission region is enlarged, the reflection region is reduced. Transmission and reflection characteristics are thus defined by a trade-off relation. In a liquid crystal display device with high resolution, the area of one picture element is small. Therefore, it is difficult to obtain a satisfactory liquid crystal display device in reflection characteristics as well as in transmission characteristics.

Further, in the reflection region, incident light is transmitted through CF (color filter) layers two times and emitted to a display screen side. Meanwhile, in the transmission region, incident light is transmitted through the CF layers only once and emitted to the display screen side. For this reason, chromaticity irregularity is generated between the cases of using the transflective type liquid crystal display device as a reflection type liquid crystal display device (hereafter, referred to as a reflection mode) and as a transmission type liquid crystal display device (hereafter, referred to as a transmission mode).

When the color purity of the CF layers is adjusted so that a bright display can be obtained when displaying in the reflection mode, the color purity in the transmission mode is deteriorated, resulting in a display in light colors. Conversely, when the color purity of the CF layers is adjusted so that satisfactory color rang can be obtained when displaying in the transmission mode, reflected light is lowered when displaying in the reflection mode, resulting in an extremely dark display.

In order to overcome the above-described problems, a structure of the liquid crystal display device is conventionally known, in which the color purity of the CF layers is made to be different between the reflection regions and the transmission regions (for example, Japanese Patent Laid-Open No. Hei 11-2811). In this structure, for example, the CF layers are not formed in the reflection regions, but formed in the transmission regions only. Accordingly, when displaying in the transmission mode, a display with high color purity can be obtained, and when displaying in the reflection mode, a display with high luminance, in achromatic colors though, can be obtained. However, this structure involves a problem that display quality is greatly changed when the reflection mode and the transmission mode are switched with each other. Moreover, in the reflection mode, a full-color display cannot be provided, involving a problem that a transmittable information quantity for users via the display screen is reduced and good display quality cannot be obtained.

In order to overcome the above-described problems, another structure of the liquid crystal display device is conventionally known, in which color purity is made to be different between the reflection regions and the transmission regions (for example, Japanese Patent Laid-Opens No. Hei 11-305248 and No. 2001-166289). However, in this structure, while the chromaticity irregularity between the transmission mode and the reflection mode can be reduced, reflection characteristics and transmission characteristics are still defined by a trade-off relation. Therefore, it is difficult to improve both of the reflection characteristics and the transmission characteristics, raising a problem that utilization efficiency of light is degraded.

Also, there is provided a reflection type liquid crystal display device in which the color purity of the CF layers is made to be different for each picture element region (for example, Japanese Patent Laid-Open No. Hei 10-307205). In this structure, a display is produced using picture elements of six colors in total including three colors of red (R), green (G) and blue (B) with the addition of complementary colors thereof of cyan (C), magenta (M) and yellow (Y), thereby enlarging the range for color reproduction. However, an increase in a drive circuit leads to an increase in the manufacturing costs, and therefore the liquid crystal display device provided with the picture elements of six colors may not be practical. In addition, the above structure is not applicable to the transflective type liquid crystal display device.

The transflective type liquid crystal display device that improves the transmission characteristics without decreasing the reflection characteristics, is proposed in Japanese Patent Laid-Open No. 2003-202594 filed by the present applicant. This transflective type liquid crystal display device will be explained with reference to FIGS. 2 to 5. FIG. 2 shows a structure of the TFT substrates of the transflective type liquid crystal display device, and FIG. 3 shows a sectional structure of the transflective type liquid crystal device taken along the line I-I of FIG. 2. As shown in FIGS. 2 and 3, reflection electrodes 110 are formed so as to cover gate bus lines 104, data bus lines 106, and TFTs 108. The regions where the reflection electrodes 110 are formed serve as reflection regions R and R'. The regions surrounding the reflection electrodes 110 serve as transmission regions T and T'. The liquid crystal in the transmission regions T and T' are driven similarly to the liquid crystal in the reflection regions R and R' by an oblique electric field between the reflection electrodes 110 and a common electrode 130.

In this structure, the regions used neither as the reflection regions nor as the transmission regions in the conventional liquid crystal display device, are used as the transmission regions T and T'. Moreover, the areas of the gate bus lines 104, the data bus lines 106, and the TFTs 108 which are exposed in the transmission regions T and T', are decreased to a large extent. Therefore, the areas of the transmission regions T and T' can be enlarged without decreasing the areas of the reflection regions R and R'. Accordingly, the transmission characteristics can be improved without decreasing the reflection characteristics, and good display characteristics can be obtained in both of the reflection mode and the transmission mode.

FIG. 4 shows another structure of the transflective type liquid crystal display device. As shown in FIG. 4, the reflection electrodes 110 are formed in regions surrounded by the gate bus lines 104 and the data bus lines 106. The regions where the reflection electrodes 110 are formed serve as reflection regions. The reflection electrodes 110 have opening parts 150a to 150e formed therein. The opening parts 150a to 150e are opened to be formed into various shapes such as a slit-like shape and a circular or polygonal hole-like shape. The regions where the opening parts 150a to 150e are formed serve as transmission regions.

FIG. 5 shows further another structure of the transflective type liquid crystal display device. As shown in FIG. 5, the reflection electrodes 110 are formed so as to cover the gate bus lines 104, data bus lines 106, and the TFTs 108. The regions where the reflection electrodes 110 are formed serve as reflection regions. The reflection electrodes 110 have opening parts 150f to 150k formed therein which are opened to be formed into a slit-like shape, a circular or polygonal hole-like shape and the like. The regions where the opening parts 150f to 150k are formed and the regions between the adjacent reflection electrodes 110 serve as transmission regions.

In the structures shown in FIGS. 4 and 5, transparent electrodes such as ITO are not formed in the transmission regions. Therefore, the transparent electrodes and a barrier metal layer are not required to be formed therein. Moreover, for example, by forming the opening parts 150a to 150k into a shape enabling the orientation control of a liquid crystal having negative dielectric anisotropy, rubbing treatment for an oriented film can be eliminated. Accordingly, a manufacturing process of the liquid crystal display device is simplified and manufacturing costs are reduced.

As described above, according to the transflective type liquid crystal display devices as shown in FIGS. 2 to 5, the transmission characteristics can be enhanced without decreasing the reflection characteristics. At the same time, the manufacturing process can be simplified and the manufacturing costs can be reduced. However, this transflective type liquid crystal display device still has such problems as will be described below. FIG. 6 shows a schematic sectional structure of three picture elements of the liquid crystal display device taken along the line II-II of FIG. 4. As shown in FIG. 6, a light beam t of the transmission light emitted from a backlight unit (not shown) to be emitted to a display screen side, and a light beam r of the reflection light incident from the display screen side and reflected by the reflection electrode 110 to be emitted to the display screen side, pass along different light paths. That is, the light beam t of the transmission light is transmitted through the CF layer R only once. On the other hand, the light beam r of the reflection light is transmitted through the CF layer R twice. Therefore, there arises a problem that color purity is made to be different between the transmission mode display and the reflection mode display, thereby degrading display quality.

Moreover, in order to obviate the occurrence of difference in color purity between the transmission mode display and the reflection mode display, it is conventionally known that the film thickness of the CF layers in the transmission regions is made twice as thick as CF layers in the reflection regions. However, in this structure, alignment margins for tolerating alignment deviation generated when aligning a TFT substrate 102 having the reflection electrodes 110 formed thereon with a counter substrate 114 having the CF layers formed thereon, cannot be secured. For this reason, there arises a problem that when the alignment deviation is generated, color purity is made to be different between the transmission mode display and the reflection mode display, thereby degrading the display quality.

SUMMARY OF THE INVENTION

An object of the present invention is to provide a liquid crystal display device of those with high resolution, excellent in reflection characteristics compared with a conventional one, and a manufacturing method for the same.

Another object of the present invention is to provide a transflective type liquid crystal display device which can be manufactured more easily than a conventional one and is good in reflection characteristics and transmission characteristics, and a manufacturing method for the same.

Further another object of the present invention is to provide a liquid crystal display device having good display quality.

The above-described problems are solved by a liquid crystal display device constituted by enclosing liquid crystal between a pair of substrates. The liquid crystal display device includes, on one of the pair of substrates, gate bus lines supplied with scanning signals; data bus lines supplied with display signals; thin-film transistors having gate electrodes electrically connected to the gate bus lines and drain electrodes electrically connected to the data bus lines; a resin film divided for each picture element and having wrinkle-form surface ruggedness; reflection electrodes formed on the resin film, having fine surface ruggedness following the surface ruggedness of the resin film, and electrically connected to source electrodes of the thin-film transistors.

In the present invention, the resin film having the wrinkle-form rugged surface formed thereon is divided for each picture element. As disclosed in Japanese Patent Laid-Open No. 2002-221716, if the surface of a resin film is hardened, and followed by heat treatment, fine wrinkle-form surface ruggedness can be formed. It is confirmed, according to experiments by the present inventors, that a wrinkle-form rugged pattern formed on the surface of the resist film is not uniform when the resist film is large in size, while a uniform wrinkle-form rugged pattern is formed in accordance with the size of the resist film when the size of the resist film is reduced.

In order to obtain such an effect, a picture element is preferably set to the size corresponding to 110 to 850 ppi (pixel per inch). When the size of a picture element is large, a slit is formed on the resist film and the reflection electrode to divide the resist film and the reflection electrode for one picture element into a plurality of regions. The similar effects can be thus obtained.

Accordingly, if the sizes of the resist film and the reflection electrode are determined beforehand and a rugged pattern is formed so that light incident to a liquid crystal panel from the upside may be reflected in the direction of a normal line of a panel surface, utilization efficiency of light is improved and visibility is improved.

Note that in order to obtain good reflection characteristics, a flattened area where the average angle of the surface of the reflection electrode is 5 <or less is preferably set to 50% or more. In addition, when the resist film is divided by the slit into the plurality of regions, the length of the short side of each divided region is preferably set to 5 μm or more in order to obtain surface ruggedness of a uniform pattern on the resist film.

In addition, when the resist film and the reflection electrodes are formed so that the gate bus lines, data bus lines, and the thin-film transistors may be overlapped one another, the regions between the adjacent reflection electrodes can be set as light transmission regions through which light is transmitted, thereby realizing the transflective type liquid crystal display device. In this case, liquid crystal molecules in the light transmission regions are driven by an electric field transversely leaked from the reflection electrodes.

The above-described problems are solved by a liquid crystal display device constituted by enclosing liquid crystal between a pair of substrates, including, on one of the pair of substrates, gate bus lines supplied with scanning signals; data bus lines supplied with display signals; thin-film transistors having gate electrodes and drain electrodes, the gate electrodes being electrically connected to the gate bus lines and the drain electrodes being electrically connected to the data bus lines; a resin film divided for each picture element and disposed on upper part of the gate bus lines, the data bus lines, and the thin-film transistors; and reflection electrodes formed on the resin film and electrically connected to source electrodes of the thin-film transistors.

In the present invention, the resin film, which is divided for each picture element, and the reflection electrodes are formed so as to overlap the gate bus lines, data bus lines, and thin-film transistors. In this case, the regions between the adjacent reflection electrodes serve as light transmission regions through which light is transmitted. Accordingly, compared with a method of creating the light transmission regions by forming opening parts in the reflection electrodes, the areas of the light transmission regions can be increased even though the areas of the reflection electrodes are the same.

The above problems are solved by a manufacturing method for a liquid crystal display device including the steps of: forming on a first substrate gate bus lines supplied with scanning signals, data bus lines supplied with display signals, and thin-film transistors having gate electrodes connected to the gate bus line and drain electrodes connected to the data bus line; forming a photoresist film on upper part of the gate bus lines, the data bus lines, and the thin-film transistors; dividing the photoresist film for each picture element, and exposing and developing photoresist to form opening parts at positions corresponding to source electrodes of the thin-film transistors; hardening only a surface layer of the photoresist film; subjecting the photoresist film to heat treatment to form wrinkle-form surface ruggedness; forming on the photoresist film reflection electrodes electrically connected to the source electrodes of the thin-film transistors via the opening parts; and arranging opposingly the first substrate and a second substrate provided with an electrode made of a transparent conductive film, and enclosing liquid crystal therebetween.

According to the present invention, the photoresist film is divided for each picture element and followed by heat treatment, thereby forming surface ruggedness. In this case, it is confirmed in experiments by the present inventors that a uniform rugged pattern can be formed in accordance with the size of the photoresist film. Therefore, while considering conditions of actually using the liquid crystal display device, if the size of the resist film is set, to form a rugged pattern, so that light incident to a liquid crystal panel from the upside can be reflected in the direction of a normal line of a panel surface, utilization efficiency of light is improved and visibility is improved.

The above-described problems are solved by a manufacturing method for the liquid crystal display device, including the steps of: forming on a first substrate gate bus lines supplied with scanning signals, data bus lines supplied with display signals, and thin-film transistors having gate electrodes connected to the gate bus lines and drain electrodes connected to the data bus lines; forming a photoresist film on upper part of the gate bus lines, the data bus lines, and the thin-film transistors; dividing the photoresist film for each reflection electrode forming region overlapping with the gate bus line, the data bus line and the thin-film transistor, and exposing and developing photoresist to form opening parts at positions corresponding to source electrodes of the thin-film transistors; forming on the photoresist film reflection electrodes electrically connected to the source electrodes of the thin-film transistors via the opening parts; and arranging opposingly the first substrate and a second substrate provided with an electrode made of a transparent conductive film, and enclosing liquid crystal therebetween.

In the present invention, the resist film and the reflection electrodes are divided for each picture element so as to overlap the gate bus lines, data bus lines, and the thin-film transistors. In this case, the regions between the adjacent reflection electrodes serve as light transmission regions through which light is transmitted. Compared with a method of creating the light transmission regions by forming opening parts in the reflection electrodes, the areas of the light transmission regions can be increased even though the areas of the reflection electrodes are the same.

The above-described problems are solved by a liquid crystal display device including: a pair of substrates opposingly arranged; a liquid crystal enclosed between the pair of substrates; a plurality of picture element regions, each including a reflection region having a reflection electrode formed on one of the pair of substrates and reflecting light incident from the other substrate, and a transmission region for transmitting light incident from the one substrate, the transmission region being a region of a circumference or an opening part of the reflection electrode; and wavelength selecting layers, each formed in the transmission region, extending up to part of the reflection region, and selecting and transmitting light having a predetermined wavelength.

In the present invention, the wavelength selecting layers extend up to part of the reflection regions, and therefore when displaying in the reflection mode, the light that is transmitted though the wavelength selecting layers twice and the light that is not transmitted through the reflection selecting layers are mixed, thereby providing a high luminance display. Moreover, the area ratio of the regions for forming the wavelength selecting layers of the reflection regions to the entire reflection regions is adjusted, thereby making the color purity of the reflection mode display closer to the color purity of the transmission mode display. Thus, the transflective type liquid crystal display device with good display quality can be obtained.

BRIEF DESCRIPTION OF THE DRAWINGS

FIGS. 9A to 9M are schematic sectional views showing a manufacturing method for a TFT substrate of the liquid crystal display device according to the first embodiment of the present invention in a process order.

FIG. 10 is a view showing relations of transmissive aperture ratio and effective reflection area ratio to resolution, between a conventional transflective type liquid crystal display device and the transflective type liquid crystal display device of the first embodiment.

DESCRIPTION OF THE PREFERRED EMBODIMENTS

Hereafter, preferred embodiments of the present invention will be explained with reference to the accompanying drawings.

First Embodiment

Figure 7:
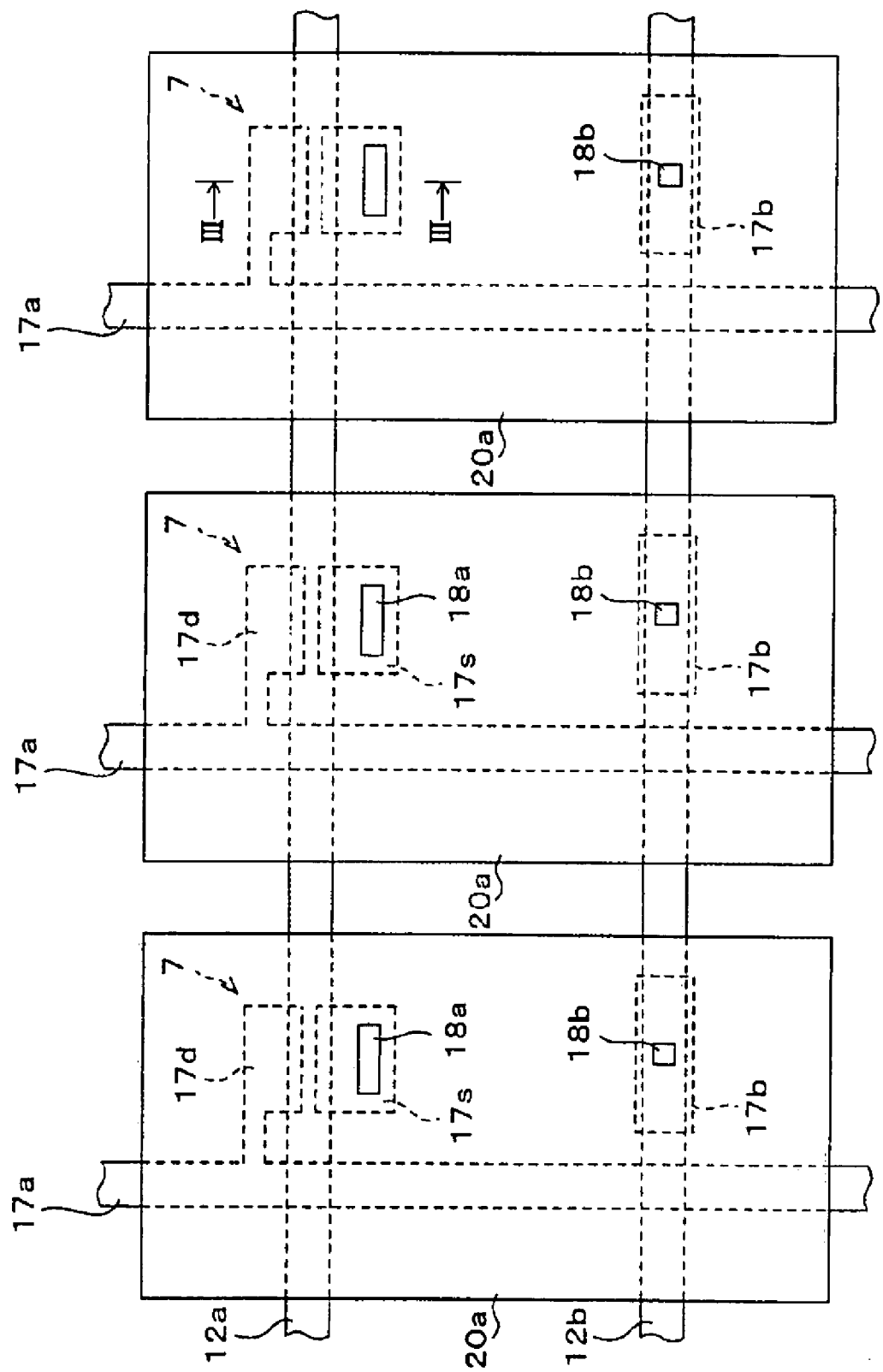
FIG. 7 is a plan view showing a liquid crystal display device according to a first embodiment of the present invention.
Figure 8:
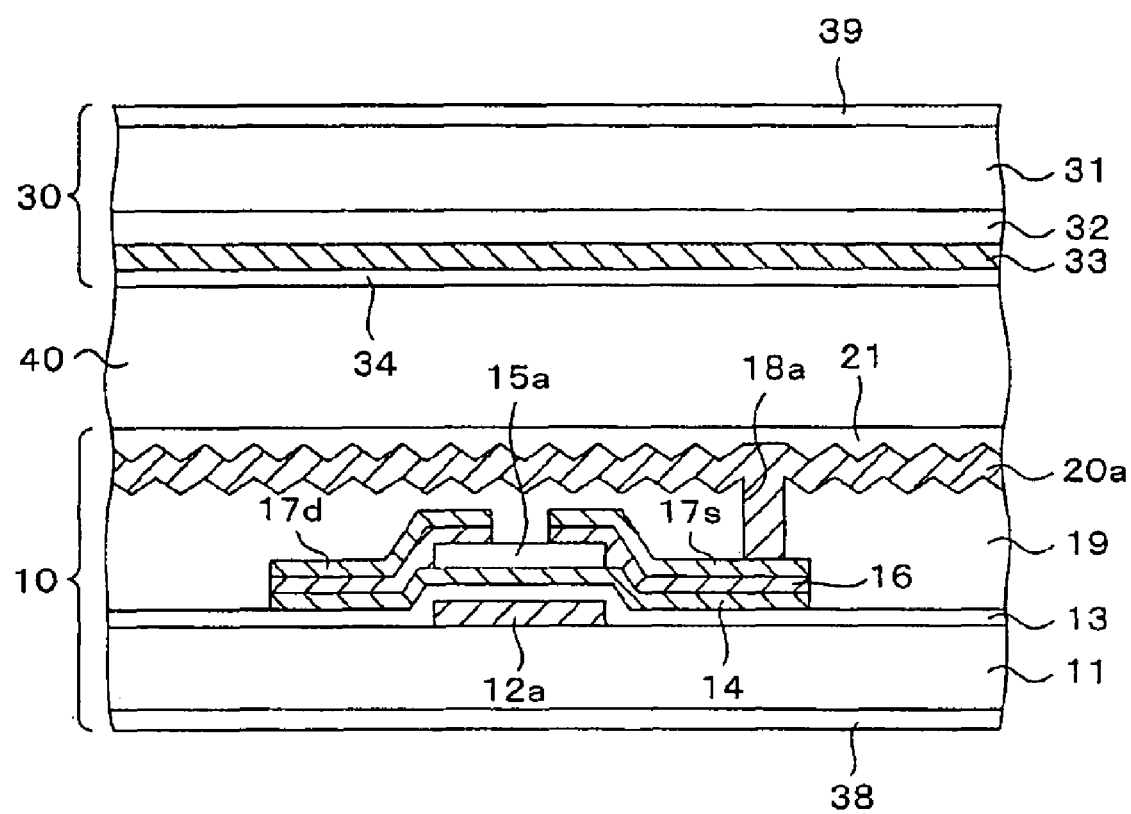
FIG. 8 is a schematic sectional view taken along the line III-III of FIG. 7.

FIG. 7 is a plan view showing a liquid crystal display device of a first embodiment of the present invention, and FIG. 8 is a schematic sectional view taken along the line III-III of FIG. 7. Note that this embodiment shows an example in which the present invention is applied to a transflective type liquid crystal display device using a VA (vertically aligned) type liquid crystal.

As shown in FIG. 8, the liquid crystal display device of this embodiment is constituted including a TFT substrate 10 and a counter substrate 30, and a vertically aligned nematic liquid crystal 40. The TFT substrate 10 and the counter substrate 30 face each other, and the vertically aligned nematic liquid crystal 40 is enclosed between these substrates. Polarizing plates (linear polarizing plate or circular polarizing plate having the linear polarized light+fE/4 phase difference combined) 38 and 39 are arranged under the TFT substrate 10 and on the counter substrate 30, respectively. In addition, a light source (backlight: not shown) is disposed below the TFT substrate 10.

As shown in FIGS. 7 and 8, the TFT substrate 10 is constituted including a glass substrate 11, gate bus lines 12a formed on the glass substrate 11, storage capacitor bus lines 12b, data bus lines 17a, storage capacitor electrodes 17b, TFTs 7 and reflection electrodes 20a and the like. The gate bus lines 12a and the storage capacitor bus lines 12b horizontally extend, and the data bus lines 17a vertically extend. The gate bus lines 12a and the storage capacitor bus lines 12b are covered with a gate insulating film 13 and electrically disconnected from the data bus lines 17a by this gate insulating film 13.

In the vicinity of each portion where the gate bus line 12a and the data bus line 17a intersect with each other, the TFT 7 is formed. This TFT 7 is constituted by using a silicon film (amorphous silicon film or polysilicon film) 14 formed on the gate insulating film 13 as an operating layer, and using part of the gate bus line 12a as a gate electrode. A channel protection film 15a made of SiN is formed on the channel region of this TFT 7. A drain electrode 17d and a source electrode 17s are respectively formed on both sides of the channel protection film 15a. These drain electrode 17d and source electrode 17s are electrically connected to the silicon film 14 via an $n^+$ type amorphous silicon film 16, which is an ohmic contact layer. Moreover, the drain electrode 17d is electrically connected to the data bus line 17a, and the source electrode 17s is electrically connected to the reflection electrode 20a.

Further, the storage capacitor electrodes 17b are formed above the storage capacitor bus lines 12b via the gate insulating film 13.

The TFTs 7 and the storage capacitor electrodes 17b are covered with a final protection film (not shown) made of SiN or the like, and a resist film 19 having a finely rugged surface is formed thereon. The reflection electrodes 20a made of Al or the like are formed on the resist film 19. The reflection electrode 20a is electrically connected to the source electrode 17s of the TFT 7 and the storage capacitor electrode 17b via contact holes 18a and 18b formed on the final protection film and the resist film 19. Moreover, a rugged pattern following that of the resist film 19 is formed on the surface of the reflection electrode 20a.

In this embodiment, the resist film 19 is formed only below the reflection electrode 20a. In addition, the resolution of the liquid crystal display device of this embodiment is 110 to 850 ppi, and the size of the reflection electrode 20a is set according to the resolution. Further, in this embodiment, as shown in FIG. 7, the reflection electrode 20a is formed so as to overlap the gate bus line 12a, the storage capacitor bus line 12b, the data bus line 17a and the TFT 7, and the region between the adjacent reflection electrodes 20a serves as a transmission region through which light is transmitted is formed.

An alignment layer 21 made of polyimide or the like is formed on the reflection electrode 20a. In this embodiment, the surface of the alignment layer 21 is not subjected to rubbing treatment. However, the rubbing treatment may be applied thereto.

Meanwhile, the counter substrate 30 is constituted including a glass substrate 31, color filters 32 formed on one face side (lower side in FIG. 8) of the glass substrate 31, and a common electrode 33. The color filters 32 have three colors of red (R), green (G) and blue (B), and the color filter 32 of one of the colors is arranged in one picture element.

The common electrode 33 is formed under the color filters 32, and an alignment layer 34 made of polyimide or the like is formed under the common electrode 33. The surface of the alignment layer 34 is subjected to rubbing treatment which decides orientation direction of liquid crystal molecules when no electric field is applied thereto.

The TFT substrate 10 and counter substrate 30 are arranged interposing spacers (not shown) for maintaining a constant interval therebetween, and joined by a sealing material (not shown) coated onto the outside of a display region.

In the liquid crystal display device of this embodiment, positions of the gate bus lines 12a and the data bus lines 17a are different from those in a conventional transflective type liquid crystal display device. Regions contributing neither to the reflection characteristics nor the transmission characteristics in the conventional liquid crystal display device, that is, the regions between the adjacent reflection electrodes are used as transmission regions in this embodiment. The liquid crystal molecules in these regions are driven by an electric field transversely leaked from the reflection electrodes 20a.

Moreover, in this embodiment, the resist film 19 is divided for each picture element. On the surface of this resist film 19, wrinkle-form ruggedness is provided by hardening and subjecting to heat treatment only a surface layer of the resist film 19, as will be described later. It is confirmed, according to experiments by the present inventors, that a wrinkle-form rugged pattern formed on the surface of the resist film is not uniform when the resist film is large in size, while a uniform wrinkle-form rugged pattern is formed in accordance with the size of the resist film when the size of the resist film is made small. Accordingly, with considering conditions in actually using the liquid crystal display device, the size of the resist film is set, to form a rugged pattern, so that light incident to a liquid crystal panel from the upside can be reflected in the direction of a normal line of a panel surface. Thus, the utilization efficiency of light is improved and visibility is improved.

Although it is not proven why the rugged pattern is unformalized when the size of the resist film is made small, the reason is estimated as follows. That is, when the resist film is large in size, a portion generating ruggedness by heat treatment is not fixed. Moreover, the ruggedness is independently generated at a plurality of portions. Therefore, the rugged pattern is not uniform. However, when the size of the resist film is small, the largest working portion of stress is periodically generated in accordance with the size of the resist film. Therefore, the rugged pattern becomes uniform in accordance with the size of the resist film. In order to obtain the above effects, it is necessary to set one picture element electrode 20a to a size corresponding to the resolution of 110 to 850 ppi.

Note that the rugged pattern formed on the resist film also relates to the film thickness of the resist film. In addition, in order to efficiently reflect the light incident from the upside of the liquid crystal display device in the direction of a normal line of a panel surface, a flattened area (area where the average angle of inclination is 5<or less) in a surface of the reflection electrode is preferably set to 50% or more.

Hereafter, a manufacturing method for the liquid crystal display device of this embodiment will be explained.

FIGS. 9A to 9M are schematic sectional views showing a manufacturing method for the TFT substrate of the liquid crystal display device of this embodiment in a process order. First, as shown in FIG. 9A, a metal film 12 is formed on the glass substrate 11 by sputtering, and a resist film 41 of a predetermined pattern is formed thereon using photoresist.

Next, as shown in FIG. 9B, the metal film 12 is etched using the resist film 41 as a mask to form the gate bus lines 12a and storage capacitor bus lines 12b. Thereafter, the resist film 41 is removed.

Figure 9C:
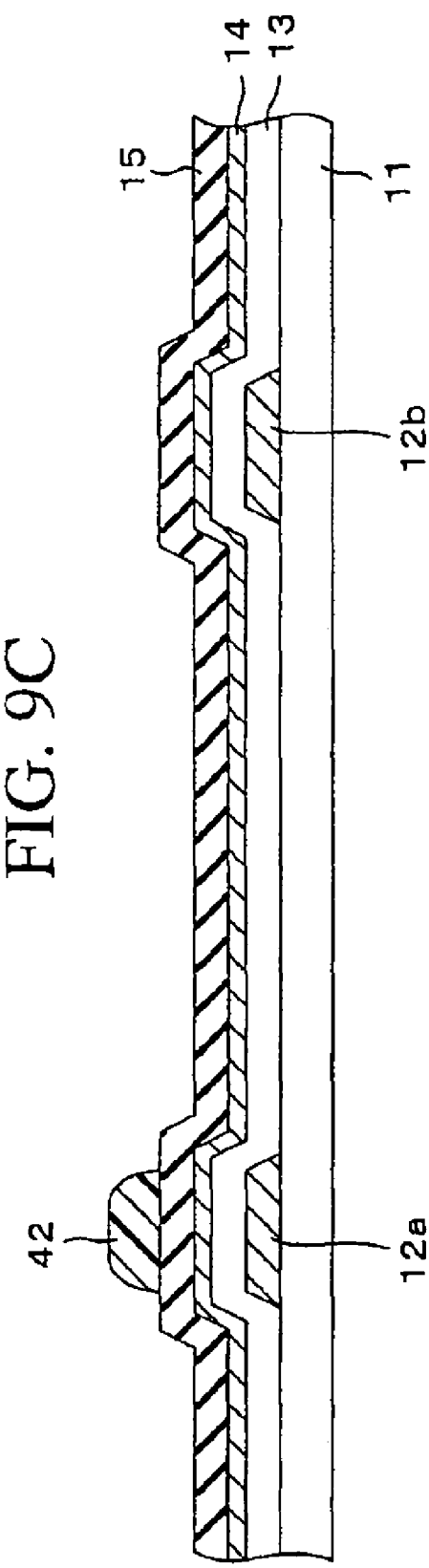

Next, as shown in FIG. 9C, the gate insulating film 13 is formed on the entire upper surface of the glass substrate 11 by a plasma CVD method. Further, the amorphous silicon film 14 to be the operating layer of the TFT, and a SiN (silicon nitride) film 15 to be the channel protection film are sequentially formed thereon.

Thereafter, a positive type photoresist film is formed on the SiN film 15. Then, the photoresist film is exposed to light from the rearside of the glass substrate 11, and further exposed from the frontside of the glass substrate 11 via a predetermined exposure mask. Thereafter, the photoresist film is subjected to a development process to form a resist film 42 covering channel protection film forming regions above the gate bus lines 12a.

Figure 9D:
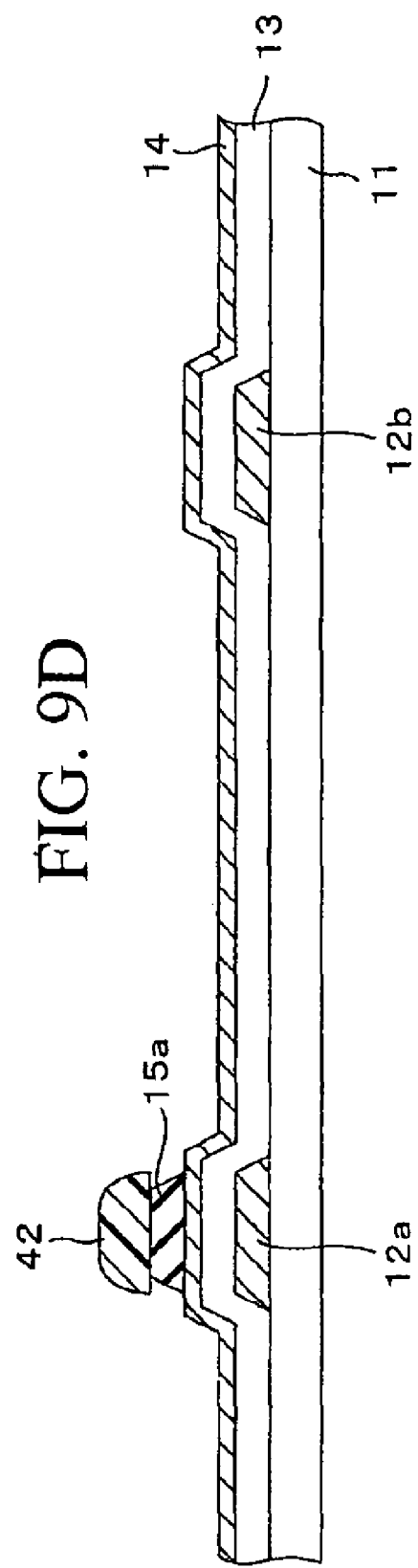

Next, as shown in FIG. 9D, the SiN film 15 is etched using the resist film 42 as a mask to form the channel protection films 15a. Thereafter, the resist film 42 is removed.

Next, as shown in FIG. 9E, the $n^+$ type amorphous silicon film 16 to be the ohmic contact layer is formed on the entire upper surface of the glass substrate 11. Thereafter, a metal film 17 to be the data bus lines, the source electrodes and the drain electrodes are formed by a PVD (Physical Vapor Deposition) method. Then, a resist film 45 of a predetermined pattern is formed on the metal film 17 using photoresist.

Next, as shown in FIG. 9F, the metal film 17, the $n^+$ type amorphous silicon film 16 and the silicon film 14 are etched to secure the shape of the silicon film 14 to be the operating layer of the TFT 7. Simultaneously, the data bus lines 17a, the source electrodes 17s, the drain electrodes 17d, and the storage capacitor electrodes 17b are formed. At this time, part of the silicon film 14 intended to be a channel of the TFTs 7 is protected by the protection films 15a. Thereafter, the resist film 45 is removed.

Next, as shown in FIG. 9G, the final protection film 18 is formed on the entire upper surface of the glass substrate 11 using, for example, SiN. Then, a resist film 46 having contact hole forming parts opened thereon is formed on the final protection film 18.

Next, as shown in FIG. 9H, the final protection film 18 is etched using the resist film 46 as a mask to form contact holes 18a and 18b reaching the source electrode 17s and the storage capacitor electrode 17b, respectively. Thereafter, the resist film 46 is removed.

Next, as shown in FIG. 9I, the positive type photoresist film 19 is formed on the entire upper surface of the glass substrate 11, which is then subjected to exposure and development processes to form opening parts where the contact holes 18a and 18b are exposed and to divide the resist film 19 for each picture element. Subsequently, post-baking at a temperature of 130 to 145° C., the surface layer of the resist film 19 is further irradiated with a UV ray (ultraviolet ray) to crosslink the polymers in the surface layer. Next when baking at a temperature of 200° C. or more, since thermal deformation characteristics (coefficient of thermal expansion or of thermal shrinkage) between the surface layer (crosslinked part) and the deep part thereof (not crosslinked part) of the resist film 19 are different, fine wrinkle-form ruggedness is generated, as shown in FIG. 9J, on the surface of the resist film 19. In this case, as described before, the resist film 19 is divided into small regions for each picture element in this embodiment, and therefore the rugged pattern formed on the resist film 19 is uniformalized D Note that in this embodiment, only the surface layer of the resist film 19 is hardened by UV irradiation. However, inner stresses in the thickness direction of the resist film may be changed by irradiation of heat, plasma, UV, or ion beam.

Next, as shown in FIG. 9K, the entire upper surface of the glass substrate 11 is subjected to sputtering with Al to form a metal film 20. On the surface of the metal film 20 on the resist film 19, fine ruggedness is formed following that of the resist film 19. This metal film 20 is electrically connected to the source electrodes 17s and the storage capacitor electrodes 17b via contact holes 18a and 18b. Thereafter, a resist film 48 is formed in a predetermined pattern to secure the shapes of the reflection electrodes.

Subsequently, as shown in FIG. 9L, the metal film 20 is etched using the resist film 48 as a mask to form a reflection electrode 20a for each picture element. Thereafter, as shown in FIG. 9M, the resist film 48 is removed. Then, an alignment layer (not shown) made of polyimide and the like is formed on the entire upper surface of the glass substrate 11. In this way, the reflection electrodes 20a having finely rugged surfaces is formed.

Hereafter, a manufacturing method of the counter substrate 30 will be explained. First, a red color-photosensitive resin, a green color-photosensitive resin, and a blue color-photosensitive resin are used to form the color filters 32 on one face (on the lower face in FIG. 8) of the glass substrate 31.

Next, ITO is sputtered onto the color filters 32 to form the transparent common electrode 33. Then, the alignment layer 34 made of polyimide is formed on the common electrode 33, thereby completing the counter substrate 30.

Next, the spacers (not shown) are arranged for maintaining a constant interval between the TFT substrate 10 and the counter substrate 30, and the liquid crystal 40 is enclosed between the TFT substrate 10 and the counter substrate 30 using a vacuum injection method or a dropping injection method. In this way, the transflective type liquid crystal display device as shown in FIGS. 7 and 8 is completed.

Figure 1:
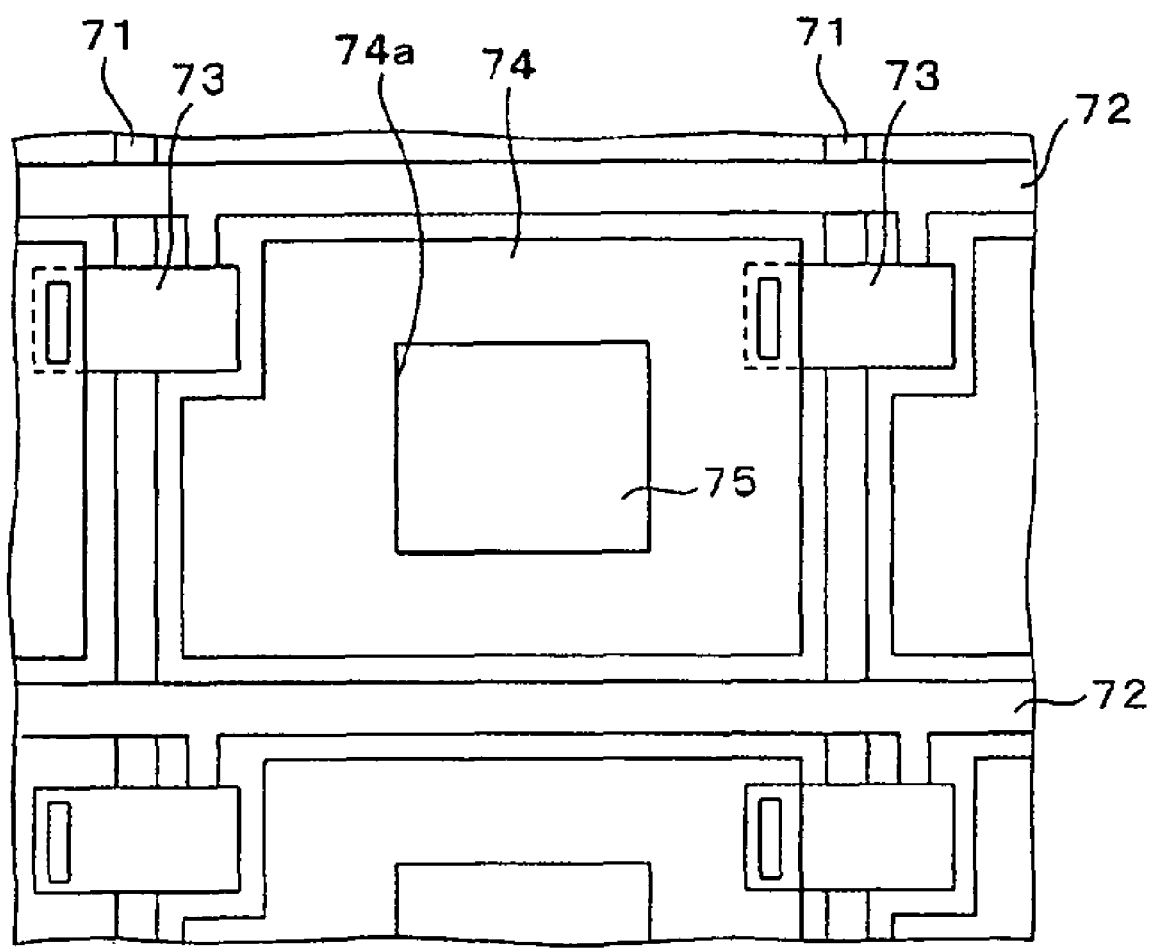
FIG. 1 is a schematic diagram showing an example of a TFT substrate of a conventional transflective type liquid crystal display device.

FIG. 10 is a view showing relations of transmissive aperture ratio and effective reflection area ratio to resolution, between the conventional transflective type liquid crystal display device shown in FIG. 1 and the transflective type liquid crystal display device of this embodiment, with the resolution (ppi) as the abscissa and with transmissive aperture ratio (left axis) and effective reflection area ratio (right axis) as the ordinate. Herein, in the conventional liquid crystal display device, the transmissive aperture ratio is fixed to be 14% regardless of the resolution. In addition, an inter-picture element interval is set to 8 fÊm, a width of the data bus lines is set to 5fÊm, a width of the storage capacitor bus lines is set to 12fÊm, and a width of the gate bus lines is set to 10fÊm.

As shown in this FIG. 10, in the conventional liquid crystal display device, the effective reflection area ratio is about 74% when the resolution is 125 ppi, and as the resolution is higher, the effective reflection area ratio is decreased. Meanwhile, in the liquid crystal display device of this embodiment, the transmissive aperture ratio is about 14% and the effective reflection area ratio is about 85% when the resolution is 125 ppi, and thereby it is clarified that the effective reflection area ratio is large compared with the conventional example. Moreover, in this embodiment, when the resolution is about 180 ppi, the transmissive aperture ratio is about 18%, and the effective reflection area ratio is about 78%. In order to recognize small characters described in catalogues or the like, the resolution of 180 ppi or more is required. That is, from FIG. 10, it is found that the liquid crystal display device of this embodiment is good in reflection characteristics and transmission characteristics, and excellent in visibility, even though having high resolution of about 180 ppi.

Figure 11:
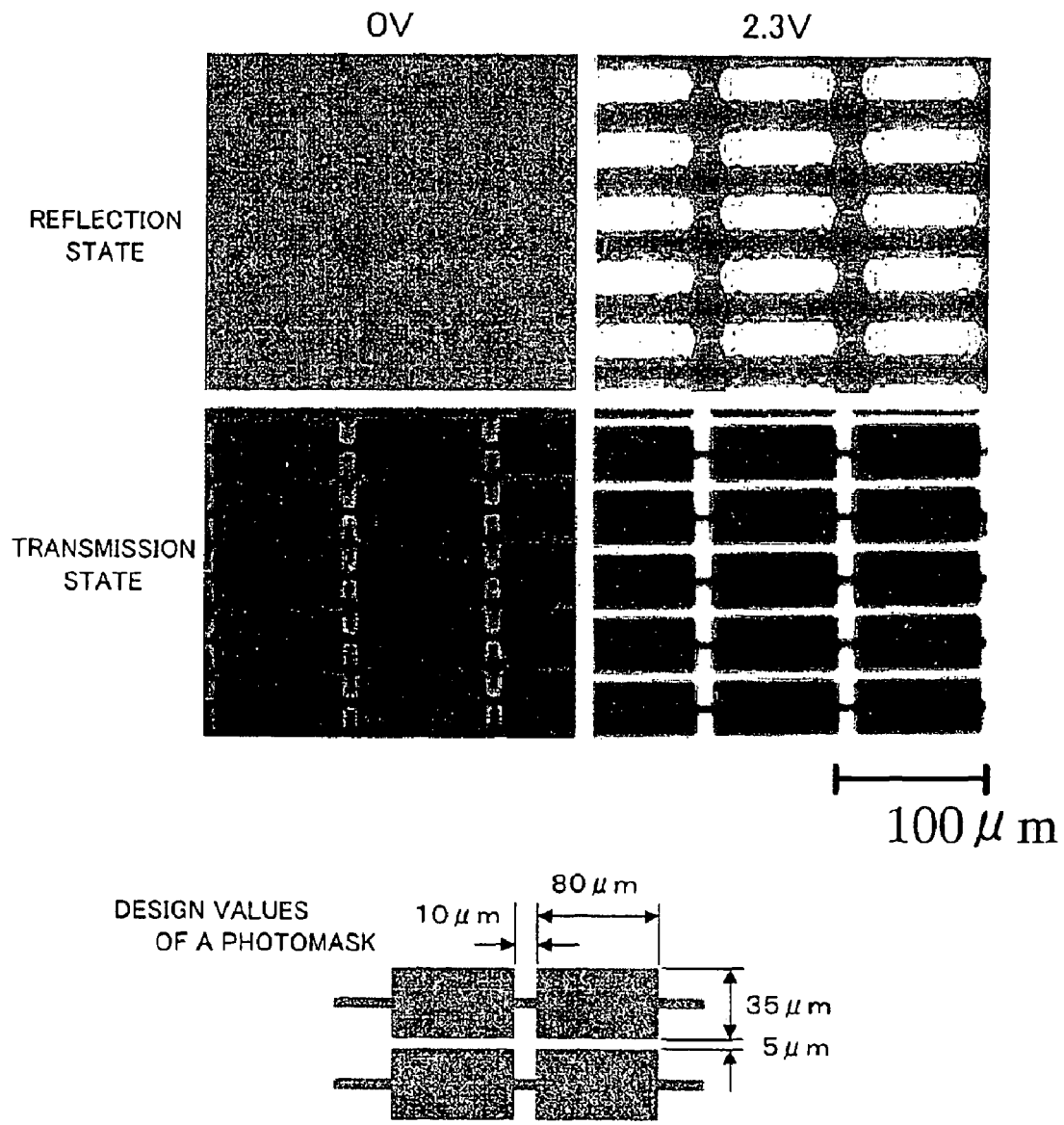
FIG. 11 is a view showing microscopic images obtained by checking a reflection state and a transmission state when applied voltages are 0V and 2.3 V, in the liquid crystal display device manufactured according to the first embodiment.
Figure 12:
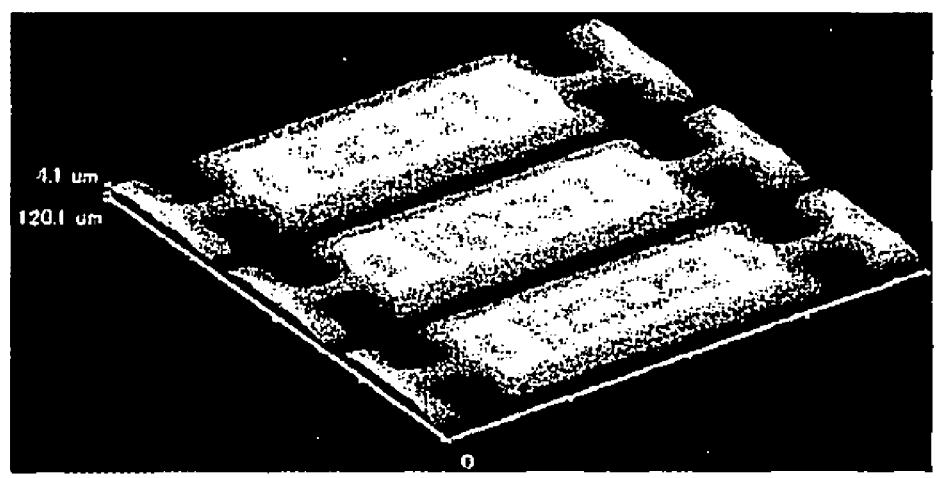
FIG. 12 is a view showing an AFM image of a reflection electrode of the liquid crystal display device according to the first embodiment.

FIG. 11 shows microscopic images obtained by checking a reflection state and a transmission state at displaying when applied voltages are 0V and 2.3 V, in the liquid crystal display device manufactured according to this embodiment. Herein, the resolution of this liquid crystal display device corresponds to 180 ppi, and a cell gap is 3 μm, and an n-type nematic liquid crystal is enclosed between the TFT substrate and the counter substrate after the vertical alignment of these substrates is subjected to rubbing treatment. A design values of a photomask used for manufacturing the liquid crystal display device is also shown in FIG. 11. Moreover, FIG. 12 shows an AFM (Atomic Force Microscope) image of the reflection electrodes of the liquid crystal display device. It is found from FIG. 11 that good characteristics can be obtained in any case of using the liquid crystal display device as a reflection type liquid crystal display device and as a transmission type liquid crystal display device.

Second Embodiment

Figure 13A:
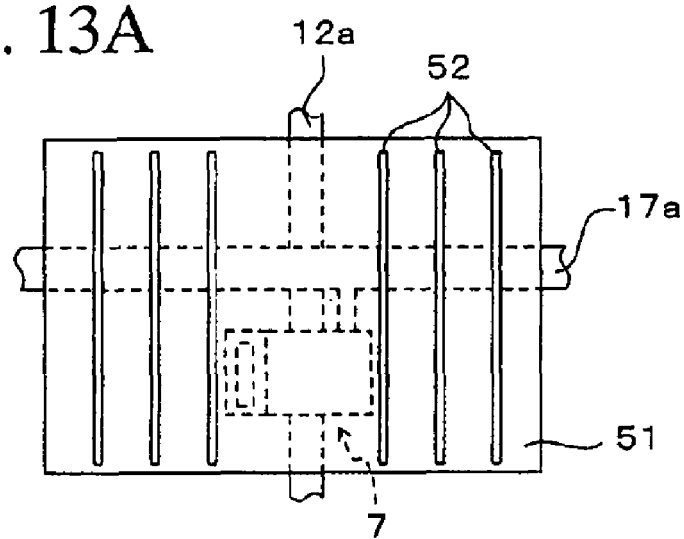
FIGS. 13A to 13C are plan views showing a transflective type liquid crystal display device according to a second embodiment of the present invention.

FIG. 13A is a plan view showing a transflective type liquid crystal display device of a second embodiment of the present invention. This embodiment is different from the first embodiment in that the reflection electrode is provided with slits. The other structure is basically the same as that of the first embodiment, and therefore overlapping explanation will be omitted.

In this embodiment, as shown in FIG. 13A, a plurality of slits 52 are provided on a reflection electrode 51 and a resist film disposed thereunder, in parallel to the gate bus line 12a. That is, by these slits 52, the resist film is divided into a plurality of regions in one picture element.

Figure 13B:
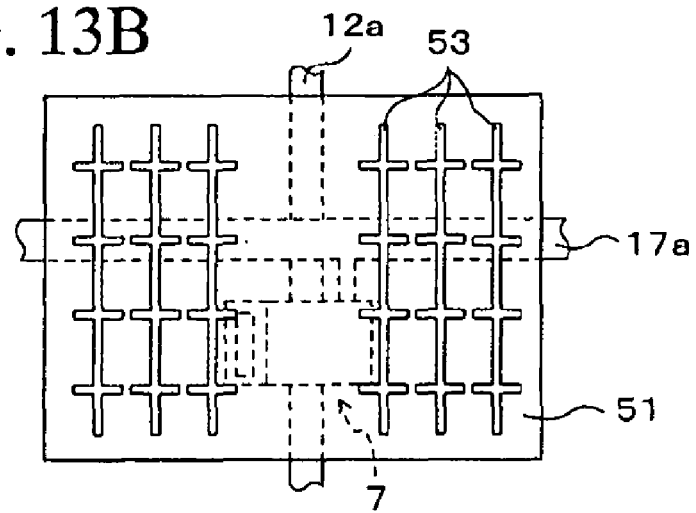
Figure 13C:
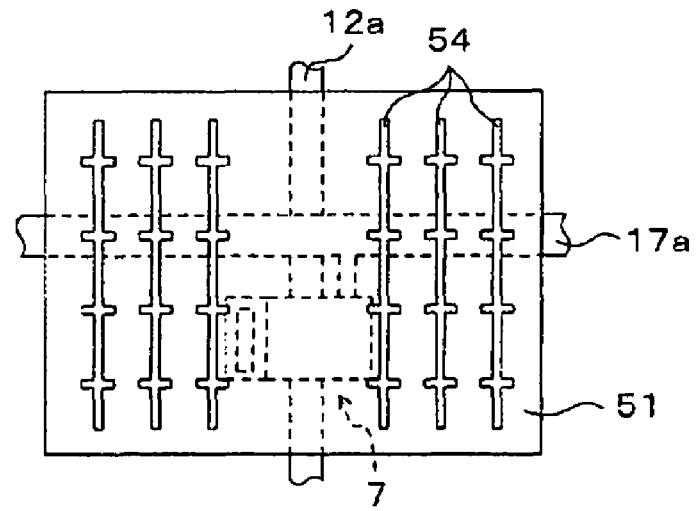

As described before, a rugged pattern formed on the resist film is determined depending on the size of the resist film. Like this embodiment, by providing the slits 52 on the reflection electrode 51 and the resist film thereunder, a desired rugged pattern can be formed on the reflection electrode 51 even when the reflection electrode 51 is large in size. In addition, slit 52 portions serve as transmission regions, thereby heightening the transmissive aperture ratio. Slits 53 or 54 having the shapes as shown in FIGS. 13B and 13C, respectively, may also be formed according to a desired rugged pattern. In order to surely form ruggedness of a uniform pattern, any short side of the regions divided by the slits 52, 53 and 54 is preferably 5 fÊm.

Figure 14:
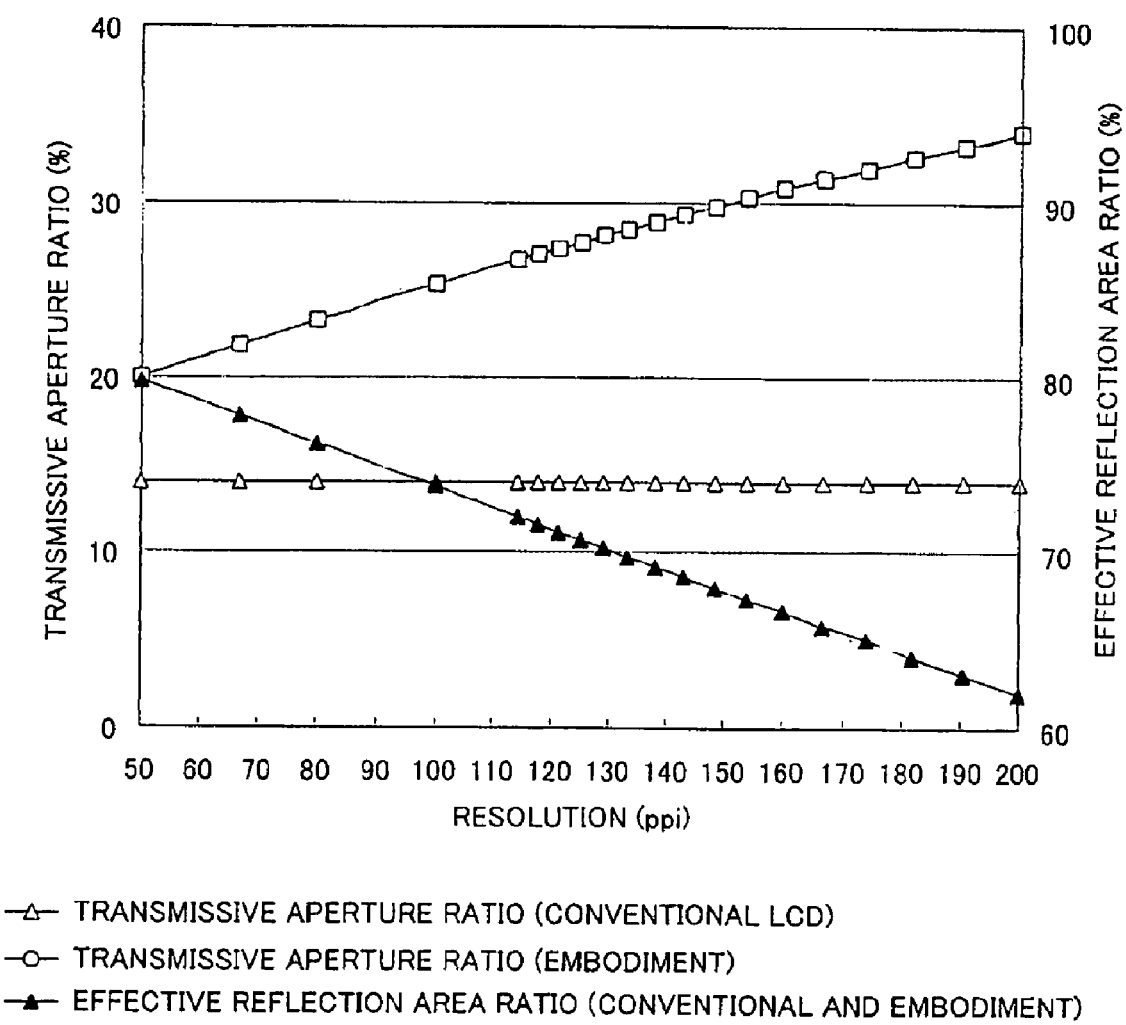
FIG. 14 is a view showing relations of transmissive aperture ratio and effective reflection area ratio to resolution, between a conventional transflective type liquid crystal display device and the transflective type liquid crystal display device of the second embodiment.

FIG. 14 is a view showing relations of transmissive aperture ratio and effective reflection area ratio to resolution, between the conventional transflective type liquid crystal display device shown in FIG. 1 and the transflective type liquid crystal display device of this embodiment, with the resolution (ppi) as the abscissa and with transmissive aperture ratio (left axis) and effective reflection area ratio (right axis) as the ordinate. Herein, in the conventional liquid crystal display device, the transmissive aperture ratio is fixed to be 14% regardless of the resolution. In addition, an inter-pixel interval is set to 8 fÊm, a width of the data bus lines is set to 5fÊm, a width of the storage capacitor bus lines is set to 12fÊm, and a width of the gate bus lines is set to 10fÊm.

As clarified from the FIG. 14, in this embodiment, ruggedness can be formed in a desired pattern even in the reflection type liquid crystal display device with a resolution of 125 ppi or less, and therefore the transflective type liquid crystal display device having high utilization efficiency of light is achieved.

Figure 15:
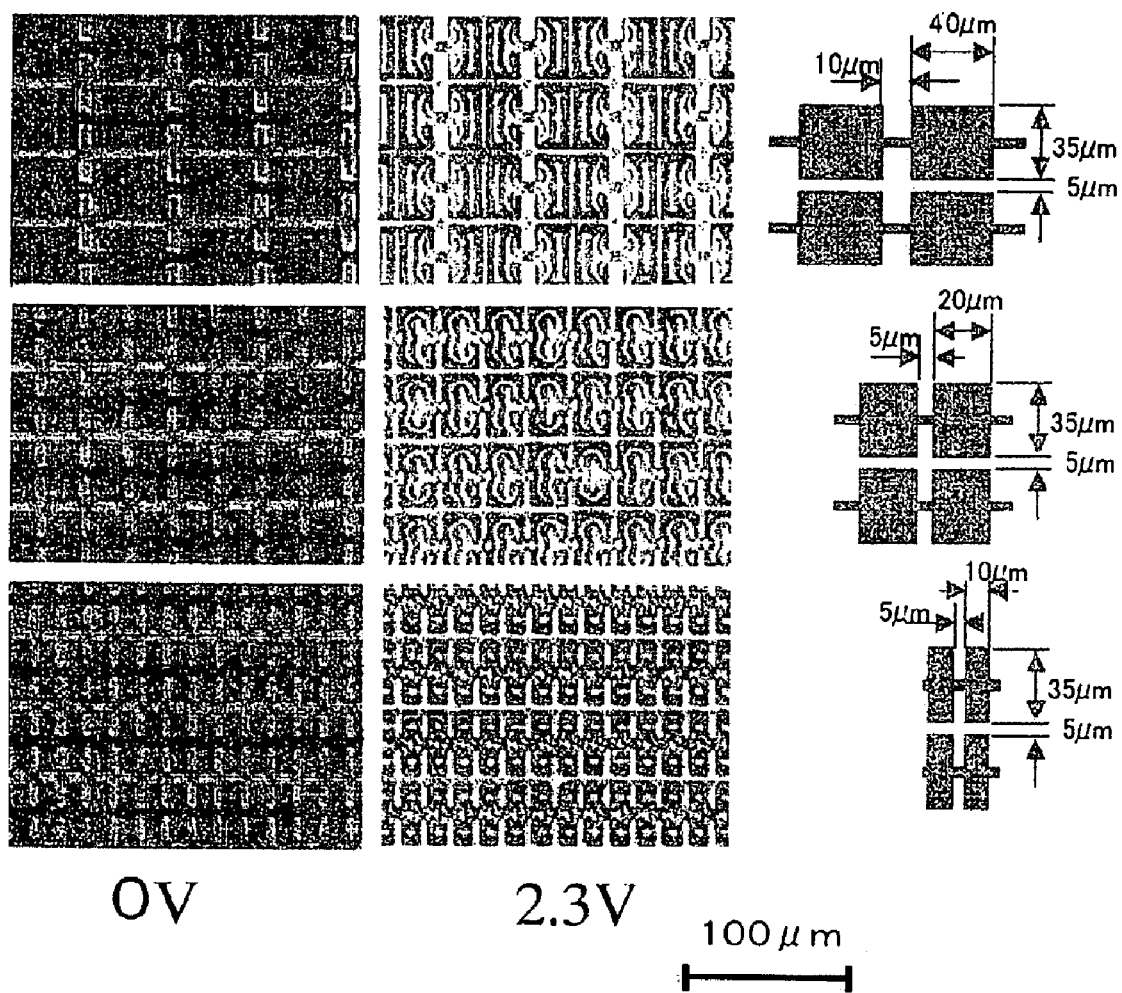
FIG. 15 is a view showing microscopic images obtained by checking a display state when applied voltages are 0V and 2.3 V, in the liquid crystal display device manufactured according to the second embodiment.

FIG. 15 shows microscopic images obtained by checking a display state at displaying when applied voltages are 0V and 2.3V, in the liquid crystal display device manufactured according to this embodiment. Designed values of a photomask used for manufacturing the liquid crystal display device is also shown in FIG. 15. It is found from the FIG. 15 that uniform rugged patterns are formed for each picture element.

Third Embodiment

Figure 16A:
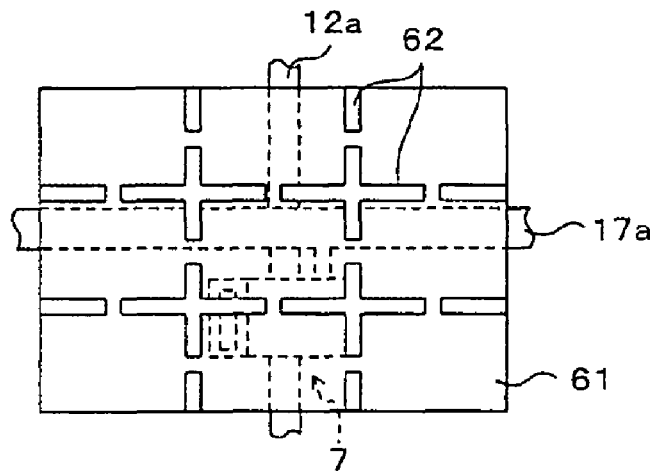
FIGS. 16A to 16C are plan views showing a transflective type liquid crystal display device according to a third embodiment of the present invention.

FIG. 16A is a plan view showing a transflective type liquid crystal display device of a third embodiment of the present invention. Note that this embodiment is different from the first embodiment in that the reflection electrode is not provided with a rugged surface, and the reflection electrode is provided with slits. The other structure is basically the same as that of the first embodiment, and therefore overlapping explanation will be omitted.

Figure 16B:
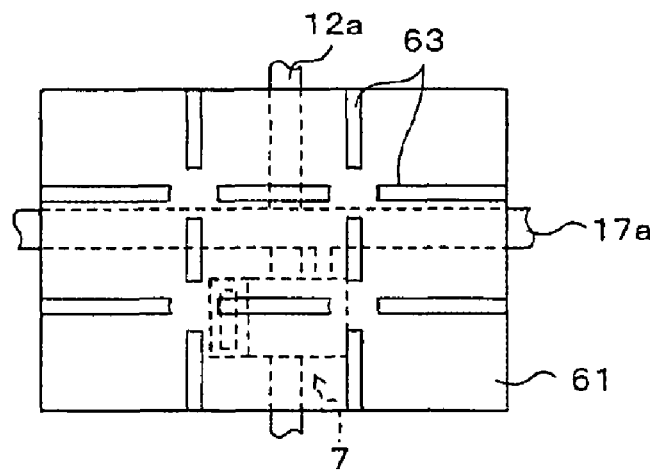
Figure 16C:
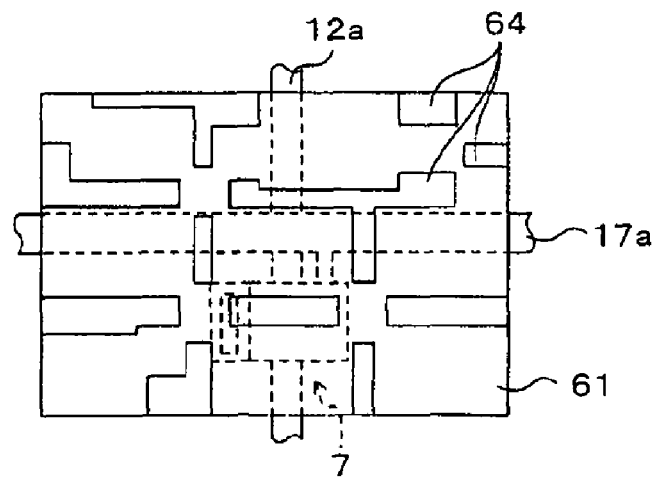

In this embodiment, as shown in FIG. 16A, a reflection electrode 61 is provided with slits 62, and slit 62 portions serve as transmission regions. Slits 63 and 64 in the shapes as shown in FIGS. 16B and 16C, respectively, may also be provided. However, the shapes of the slits are preferably common to each picture element. Moreover, any short side of the regions divided by the slits is preferably 5 μm or more.

In this embodiment, the reflection electrode 61 is formed so as to overlap the gate bus line 12a, the data bus line 17a, and the TFT 7. Moreover, the region between the adjacent reflection electrodes 61 serves as a light transmission region. Further, the reflection electrode 61 is provided with the slits 62 so as to serve as a light transmission region. Accordingly, in the liquid crystal display device of this embodiment, the transmissive aperture ratio is high compared with the conventional one, thereby improving the reflection characteristics as well as the transmission characteristics.

Figure 17:
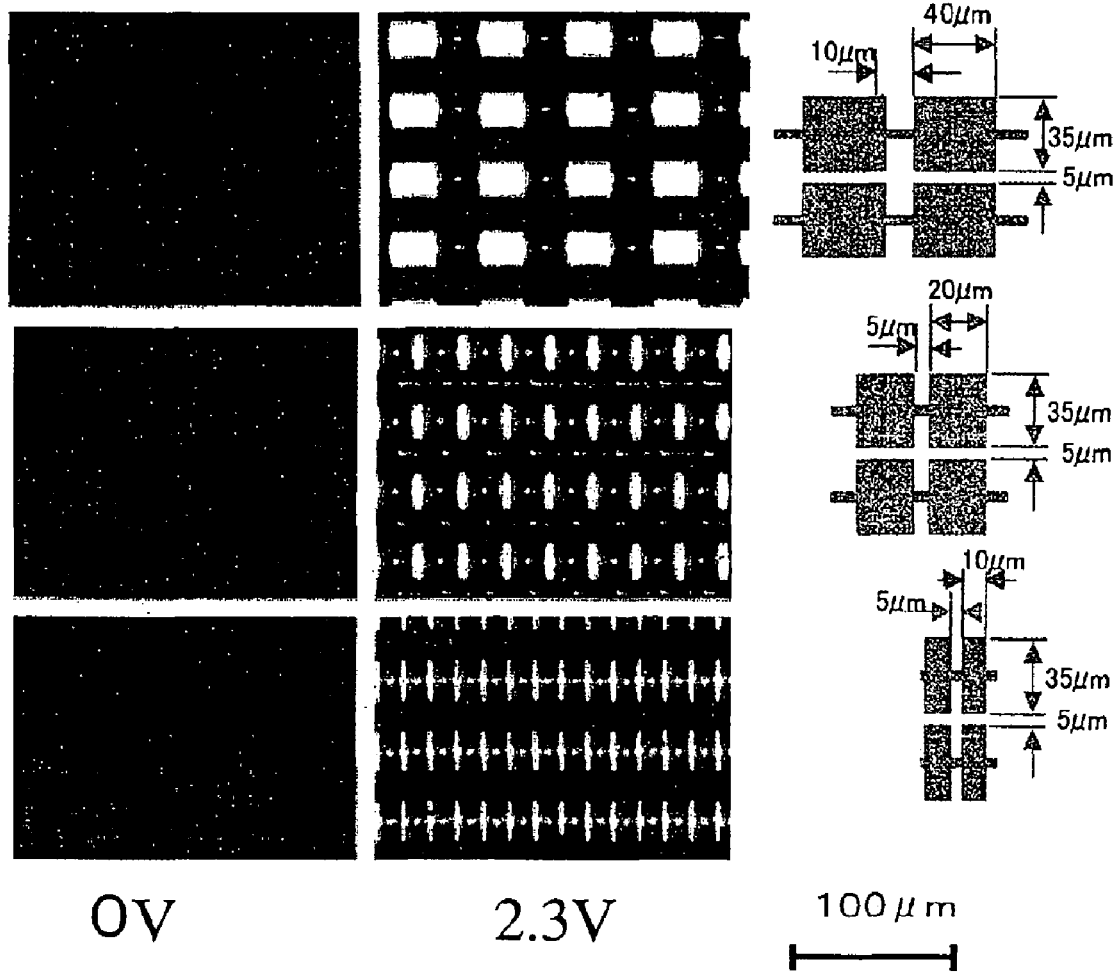
FIG. 17 is a view showing microscopic images obtained by checking a display state when applied voltages are 0V and 2.3 V, in the liquid crystal display device manufactured according to the third embodiment.

FIG. 17 shows microscopic images obtained by checking a display state at displaying when applied voltages are 0V and 2.3V, in the liquid crystal display device manufactured according to this embodiment. Design values of a photomask used in manufacturing the liquid crystal is also shown in FIG. 17. From the FIG. 17, according to this embodiment, it is found that the reflection type liquid crystal display device having high utilization efficiency of light and good visibility even when the resolution is 125 ppi or less, can be achieved.

Note that in any of the above first to third embodiments, explanation was given to the case of applying the present invention to the vertically aligned (VA) type liquid crystal display device. However, the application of the present invention is not thereby limited to the vertically aligned type liquid crystal display device. The present invention can also be applied to a horizontally aligned type liquid crystal display device, a hybrid alignment type liquid crystal display device and the like.

Fourth Embodiment

Figure 18:
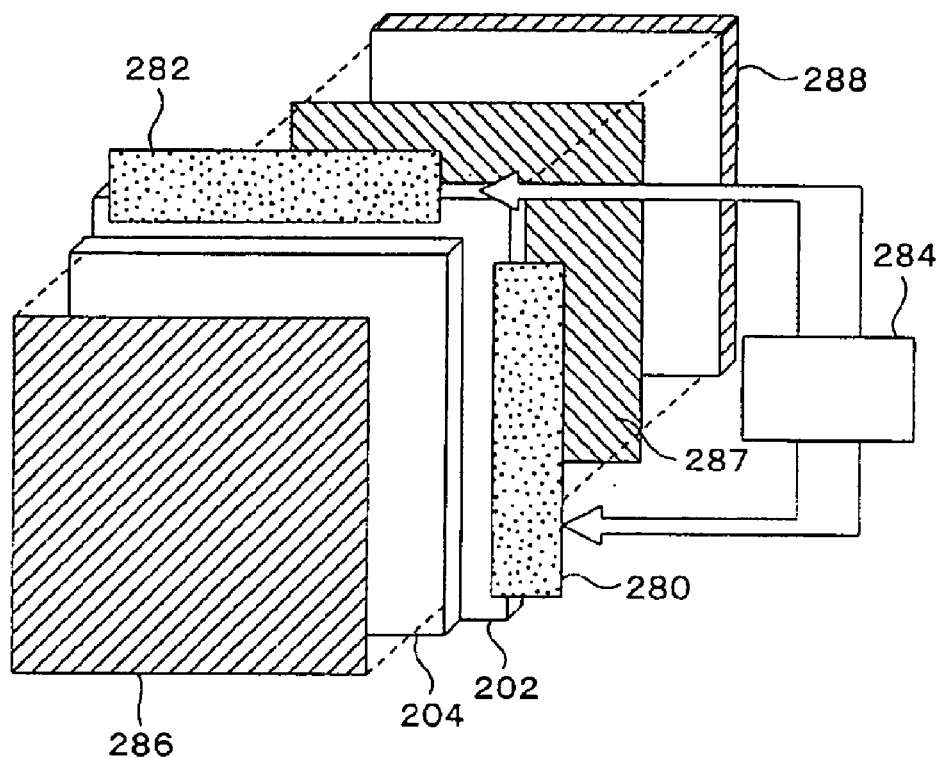
FIG. 18 is an outline structure of a liquid crystal display device according to a first basic structure of a fourth embodiment of the present invention.

A liquid crystal display device according to a fourth embodiment of the present invention will be explained with reference to FIGS. 18 to 28. First, a first basic structure of the present invention, which is a presupposition of this embodiment, will be explained by use of FIGS. 18 to 28. FIG. 18 shows an outline structure of a liquid crystal display device according to this basic structure. As shown in FIG. 18, for example, the VA (Vertically Aligned) type liquid crystal display device has a structure in which a TFT substrate 202 and a counter substrate 204 are opposingly aligned with each other, and a liquid crystal 206 (not shown in FIG. 18) is enclosed therebetween. The TFT substrate 202 has a picture element electrode, a TFT and the like formed thereon for each picture element region, and the counter substrate 204 has a CF (color filter) layer and the like formed thereon. The liquid crystal 206 has a negative dielectric anisotropy. On the opposing surfaces of the both substrates 202 and 204, a vertically aligned film is formed for aligning liquid crystal molecules, for example, in the vertical direction to the surfaces of the substrates.

On the TFT substrate 202, a gate bus line drive circuit 280 and a data bus line drive circuit 282 are provided. The gate bus line drive circuit 280 has a driver IC mounted thereon for driving a plurality of gate bus lines, and the data bus line drive circuit 282 has a driver IC mounted thereon for driving a plurality of data bus lines. Both of the drive circuits 280 and 282 are adapted to output scanning signals and display signals to the predetermined gate bus lines or data bus lines based on predetermined signals outputted from a control circuit 284.

On the surface opposite to the element forming surface of the TFT substrate 202, a polarizing plate 287 is stuck. On the other surface of the polarizing plate 287 on the opposite side to the TFT substrate 202, for example, a backlight unit 288 including a linear primary light source and a surface light guide plate, is disposed. Meanwhile, on the other surface of the counter substrate 204 on the opposite side to the resin CF layer forming surface, a polarizing plate 286 is stuck. A linearly polarizing plate or the combination of a linearly polarizing plate and a ¼-wavelength plate is used for the light polarizing plates 286 and 287.

Figure 19:
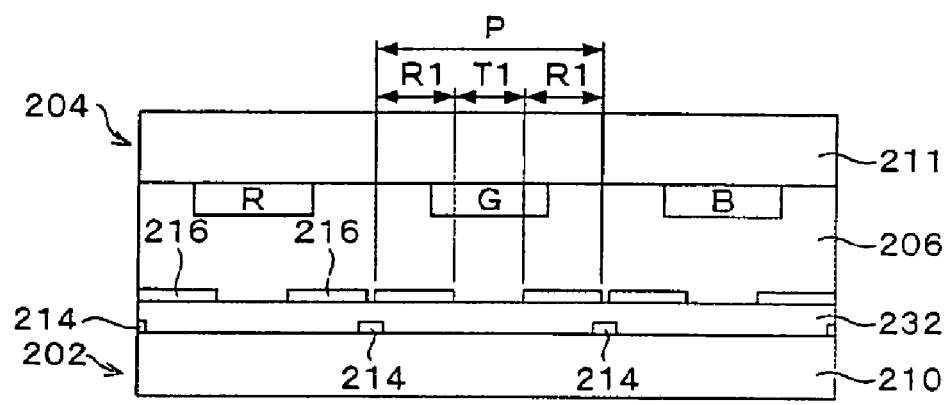
FIG. 19 is a sectional view showing a schematic structure of the liquid crystal display device according to the first basic structure of the fourth embodiment of the present invention.

FIG. 19 shows a schematic sectional structure of three picture elements of the liquid crystal display device according to this basic structure. As shown in FIG. 19, data bus lines 214, extending in the vertical direction to the paper surface, are formed on a glass substrate 210 of the TFT substrate 202. A flattening film 232 is formed on the data bus lines 214. Note that an insulating film formed on the lower layer of the data bus line 214 is not shown. Reflection electrodes 216 are formed on the flattening film 232. Ruggedness is formed on the surfaces of the reflection electrodes 216 so as to improve light reflection characteristics. The regions where the reflection electrodes 216 are formed to serve as reflection regions R1. In the reflection electrodes 216, opening parts are formed. The regions where the opening parts are formed serve as transmission regions T1. The reflection region R1 and the transmission region T1 constitute a picture element region P. Note that the surface of the reflection electrode 216 is formed into a mirror plane, and a forward scattering film may be arranged on the display screen side.

On a glass substrate 211 of the counter substrate 204, CF layers R, G and B, obtained by mixing a pigment or a dye with a transparent resin, are formed. Each layer of the CF layers R, G, and B is formed by a multilayered dielectric film, and functions as a wavelength selecting layer for selecting and transmitting the light of R, G or B, respectively. The CF layers R. G, and B are formed in the transmission regions T1 of the picture elements P, extending up to a part of the reflection regions R1. The CF layers R, G, and B have the same color purity in the part of the reflection regions R1 and in the transmission regions T1.

In this basic structure, the CF layers are formed in the part of the reflection regions R1, and in a reflection mode display, the light transmitting the CF layers twice and the light not transmitting the CF layers are mixed. Therefore, a display with high luminance can be obtained, and if the area ratio of the region of the reflection regions R1 where the CF layers are formed to the entire reflection regions R1 is adjusted, color purity at the time of displaying in the reflection mode can be close to the color purity at the time of displaying in the transmission mode. Accordingly, the transflective type liquid crystal display device having good display quality can be achieved.

Moreover, in this basic structure, even though alignment deviation occurs between the TFT substrate 202 and the counter substrate 204, if the area ratio of the region of the reflection regions R1 where the CF layers are formed to the entire reflection regions R1 is not changed, display characteristics at the time of displaying in the reflection mode are not changed. Moreover, if the area ratio of the region of the transmission regions T1 where the CF layers are formed to the entire transmission regions T1 (100% in this basic structure) is not changed, display characteristics at the time of displaying in the transmission mode is not changed. The CF layers are formed substantially around the transmission regions T1 in a width larger than the width of the transmission regions T1, to prevent the above-described area ratio from changing even when the alignment deviation occurs. Therefore, sufficient alignment margins can be secured, thereby preventing the degradation in the display quality due to the alignment deviation.

Figure 20:
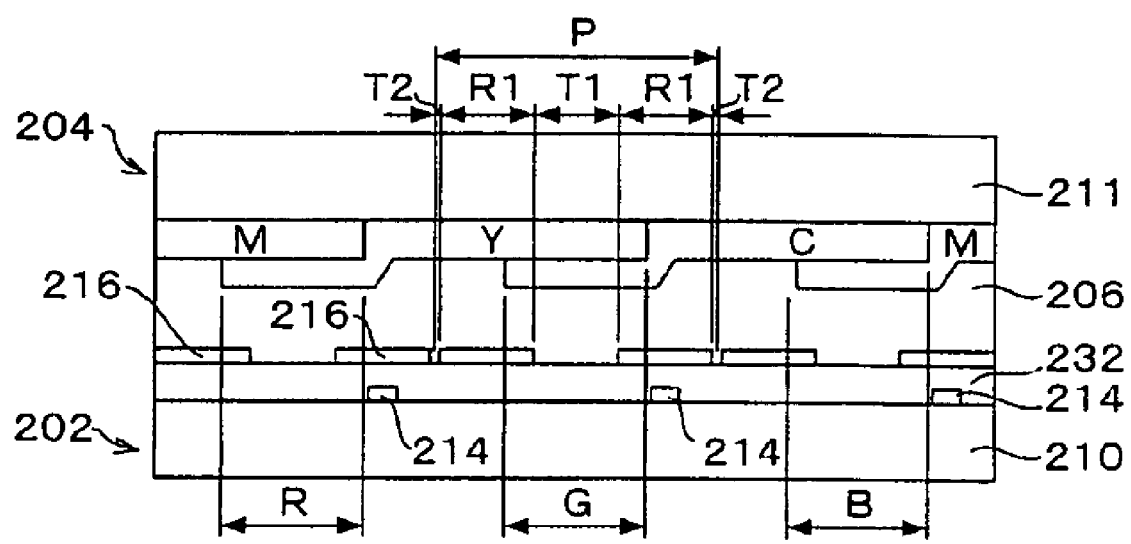
FIG. 20 is a sectional view showing a schematic structure of a liquid crystal display device according to a second basic structure of the fourth embodiment of the present invention.

Next, a liquid crystal display device according to a second basic structure of the present invention will be explained by use of FIG. 20. FIG. 20 shows a schematic sectional structure of three picture elements of the liquid crystal display device according to this basic structure. As shown in FIG. 20, the counter substrate 204 has CF layers C (cyan), M (magenta), and Y (yellow), which are complementary colors of R, G and B, for transmitting the light of the wavelengths of C, M and Y. Each color of R, G and B is displayed by the combinations of each color of C, M and Y.

The reflection electrodes 216 are formed so as to cover the data bus lines 214. The regions where the reflection electrodes 216 are formed serve as reflection regions R1. In the reflection electrodes 216, opening parts are formed. The regions where the opening parts are formed serve as transmission regions T1. Moreover, in this structure, the region from an edge of each reflection electrode 216 to substantially the central part of a gap region between the adjacent reflection electrodes 216, is used as a transmission region T2. The reflection region R1 and the transmission regions T1 and T2 constitute a picture element region P. The liquid crystal 206 in the transmission regions T1 and T2 is driven similarly to the liquid crystal 206 in the reflection regions R1 in the same picture element regions P, by an oblique electric field between the reflection electrodes 216 and a common electrode (not shown).

Each layer of the CF layers C, M, and Y is formed in the transmission region T1, extending up to part of the reflection region R1. Moreover, in the transmission regions T1 on the CF layers C, M and Y, the CF layers of different colors are laminated, extending up to both sides of the reflection regions R1. That is, layered parts where any two layers of the CF layers C, M, Y are laminated are formed in part of the reflection regions R1 and the transmission regions T1 of the picture element regions P. In the remaining regions of the reflection regions, single layer parts of only one layer of the CF layers C, M and Y, are formed. In the transmission region T1 of a picture element displaying R (RED), two layers of the CF layers M and Y are sequentially laminated. In the transmission region T1 of a picture element displaying G (GREEN), two layers of the CF layers Y and C are sequentially laminated. In the transmission region T1 of a picture element displaying B (BLUE), two layers of the CF layers C and M are sequentially laminated. Note that the order of laminating the CF layers is not limited to the orders as described above.

Moreover, in the reflection regions R1 of a picture element displaying R, the CF layers M and Y are formed with almost the same areas. In the reflection regions R1 of a picture element displaying G, the CF layers Y and C are formed with almost the same areas. In the reflection regions R1 of a picture element displaying B, the CF layers C and M are formed with almost the same areas.

In this basic structure, single layers of the CF layers C, M and Y are formed in part of the reflection regions R1. For example, in a picture element displaying G, when displaying in the reflection mode, the light transmitted through a single layer part including the CF layer C, and the light transmitted through a single layer part including the CF layer Y, are mixed. The CF layer C absorbs the wavelength of R, and therefore the light transmitted through the CF layer C has the wavelengths of B and G. Moreover, the CF layer Y absorbs the wavelength of B, and therefore the light transmitted through the CF layer Y has the wavelengths of R and G. For this reason, the mixed light has a peak at the wavelength of G to be viewed by an observer of the display screen as a light of almost green. Meanwhile, when displaying in the transmission mode, the light transmitted through the layered part where the CF layers C and Y are laminated, has the wavelength of G.

Herein, the mixed light when displaying G in the reflection mode also has the wavelengths of R and B. Therefore, chromaticity deviation occurs between a reflection mode display of G and a transmission mode display of G. Therefore, layered parts with the same structure as that of the transmission regions T1 are arranged in part of the reflection regions R1. The area ratio of the region of the reflection regions R1 where the layered parts are arranged to the entire reflection regions R1 is adjusted, thereby making the color purity of the reflection mode display closer to the color purity of the transmission mode display. Thus, the transflective type liquid crystal display device with good display quality can be obtained.

Further, in this structure similarly to the first basic structure, even though alignment deviation occurs between the TFT substrate 202 and the counter substrate 204, if the area ratio of the region of the reflection regions R1 where the layered parts are arranged to the entire reflection regions R1 does not change, display characteristics in the reflection mode are not changed. Moreover, if the area ratio of the region of the transmission regions T1 where the layered parts are arranged to the entire transmission regions T1 (100% in this basic structure) does not change, display characteristics in the transmission mode are not changed. The layered parts are formed substantially around the transmission regions T1, in a width larger than the width of the transmission region T1, to prevent the above-described area ratio from changing even when alignment deviation occurs. Therefore, sufficient alignment margins can be secured, thereby preventing the degradation in the display quality due to the alignment deviation.

Figure 21A:
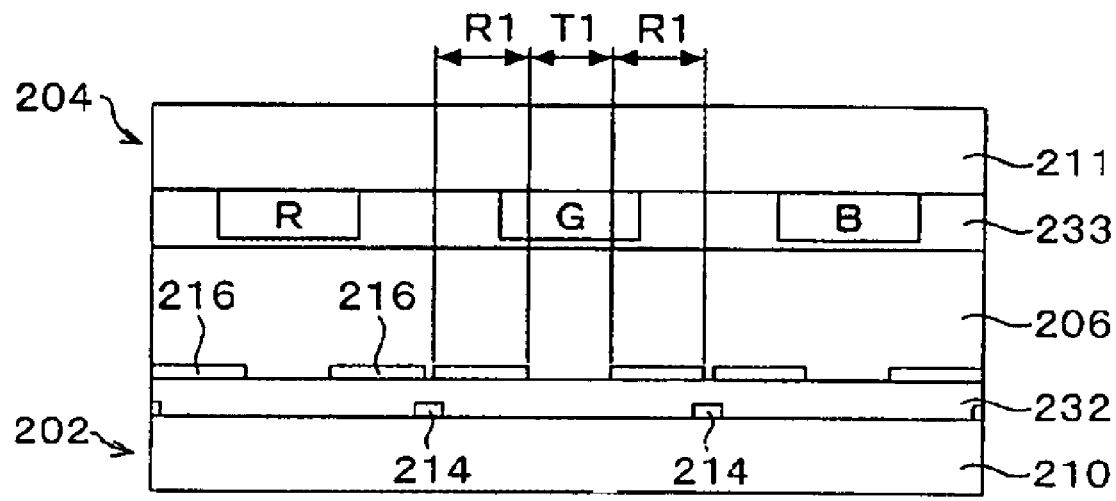
FIGS. 21A and 21B are sectional views showing a schematic structure of a liquid crystal display device according to a third basic structure of the fourth embodiment of the present invention.

Next, a liquid crystal display device according to a third basic structure of the present invention will be explained with reference to FIGS. 21A and 21B. FIG. 21A shows a schematic sectional structure of the liquid crystal display device according to this basic structure. As shown in FIG. 21A, the CF layers R, G and B of the counter substrate 204 are formed in part of the reflection regions R1 and in the transmission regions T1 of the picture element regions. On the entire surface of the substrate on the CF layers R, G, and B, a flattening film 233 for flattening the ruggedness on the surface of the counter substrate 204, is formed. With this structure, turbulence of orientation of the liquid crystal 206 caused by the ruggedness on the surface of the substrate can be suppressed, thereby improving orientation stability of the liquid crystal 206.

Figure 21B:
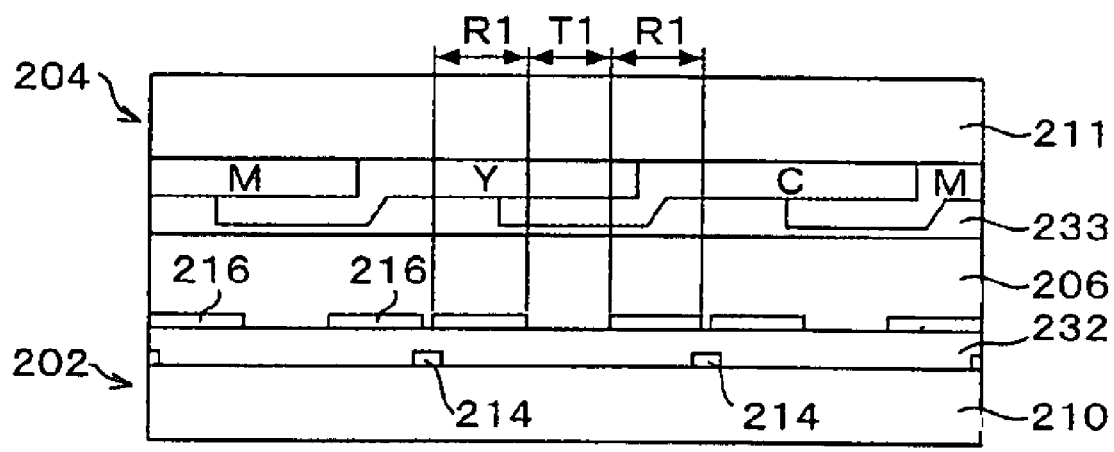

FIG. 21B shows another example of the schematic sectional structure of the liquid crystal display device according to this basic structure. As shown in FIG. 21B, on the counter substrate 204, layered parts including the laminates of the CF layers C, M and Y are formed in a part of the reflection regions R1 and in the transmission regions T1. Single layer parts of the CF layers C, M, and Y are formed in the transmission regions T1. On the entire surface of the substrate on the CF layers C, M and Y, the flattening film 233 for flattening the ruggedness on the surface of the counter substrate 204 is formed. With this structure, turbulence of the orientation of the liquid crystal 206 caused by the ruggedness on the surface of the substrate can be suppressed, thereby improving orientation stability of the liquid crystal 206.

Figure 22A:
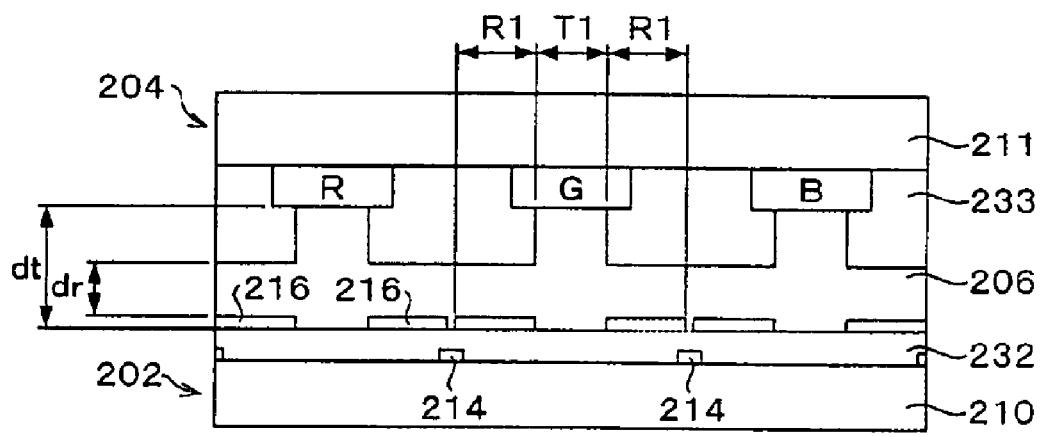
FIGS. 22A and 22B are sectional views showing schematic structures of a liquid crystal display device according to a fourth basic structure of the fourth embodiment of the present invention.

Next, a liquid crystal display device according to a fourth basic structure of the present invention will be explained by use of FIGS. 22A and 22B. FIG. 22A shows a schematic sectional structure of the liquid crystal display device according to this basic structure. As shown in FIG. 22A, on the CF layers R, G, and B of the counter substrate 204, and in the regions other than the transmission regions T1, the flattening film 233 is formed. A cell thickness dt in the transmission regions T1 where no flattening film 233 is formed is about 1 to 2.3 times (preferably about 1.7 to 2.3 times) a cell thickness dr in the reflection regions R1 where the flattening film 233 is formed. When displaying in the transmission mode, the light incident from a backlight unit side passes the liquid crystal 206 only once to emit toward a display screen side. On the other hand, when displaying in the reflection mode, the light incident from the display screen side passes the liquid crystal 206, is reflected by the reflection electrodes 216, and passes the liquid crystal 206 again to be emit toward the display screen side. Specifically, in this basic structure, the cell thickness dt in the transmission regions T1 is made almost twice the cell thickness dr in the reflection regions R1. Accordingly, a substantial retardation ($\Delta n \cdot d$) generated in the liquid crystal 206 in the transmission mode display is made nearly the same as that generated in the reflection mode display. Therefore, according to this basic structure, almost the same display characteristics between both the modes of transmission and reflection can be obtained. Note that in this basic structure, by forming the flattening film 233 on the CF substrate 204 in the region other than the transmission regions T1, the cell thickness dt in the transmission regions T1 and the cell thickness dr in the reflection regions R1 are made different. However, using the flattening film 232 on the TFT substrate 202, the cell thicknesses dt and dr may be made different.

Figure 22B:
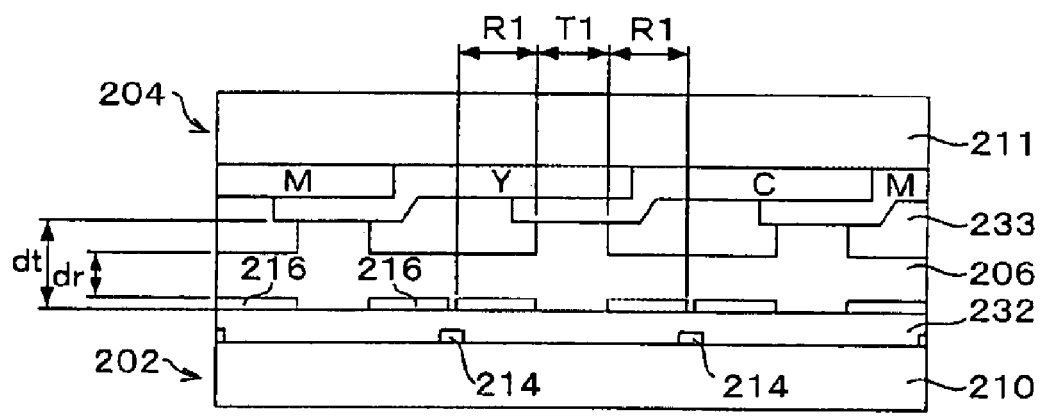

FIG. 22B shows another example of the schematic sectional structure of the liquid crystal display device according to this basic structure. As shown in FIG. 22B, on the CF layers C, M and Y of the counter substrate 204 and in the region other than the transmission regions T1, the flattening film 233 is formed. The cell thickness dt in the transmission regions T1 where no flattening film 233 is formed is about 1 to 2.3 times (preferably about 1.7 to 2.3 times) the cell thickness dr in the reflection regions R1 where the flattening film 233 is formed. According to this example also, almost the same display characteristics can be obtained in both the modes of transmission and reflection.

Figure 23:
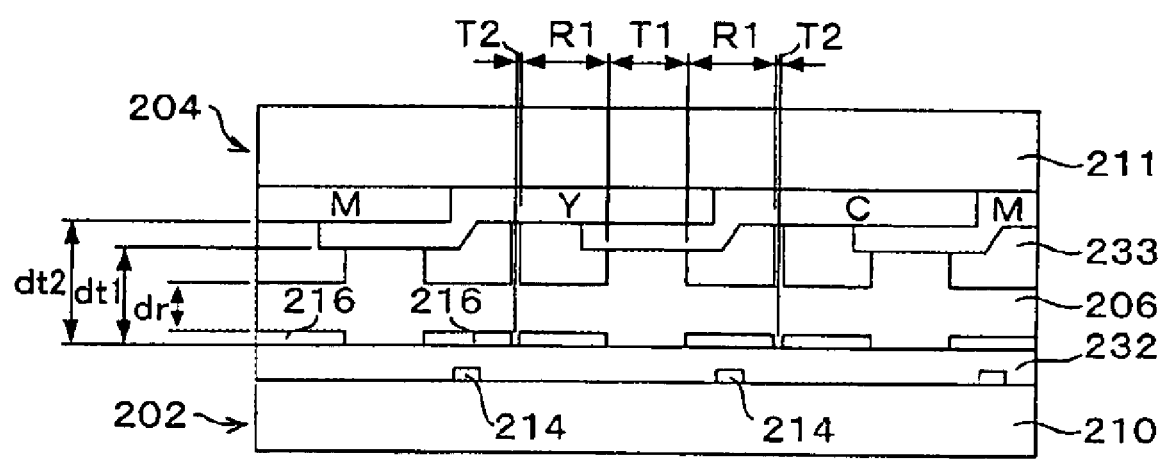
FIG. 23 is a sectional view showing a schematic structure of the liquid crystal display device according to the fourth basic structure of the fourth embodiment of the present invention.

FIG. 23 shows further another example of the schematic sectional structure of the liquid crystal display device according to this basic structure. As shown in FIG. 23, on the CF layers C, M and Y of the counter substrate 204 and in the region other than the transmission regions T1 and T2, the flattening film 233 is formed. A cell thickness dt1 in the transmission regions T1 where no flattening film 233 is formed and a cell thickness dt2 in the transmission regions T2 are about 1 to 2.3 times (preferably about 1.7 to 2.3 times) the cell thickness dr in the reflection regions R1 where the flattening film 233 is formed. According to this example also, almost the same display characteristics can be obtained in both the modes of transmission and reflection.

Figure 24A:
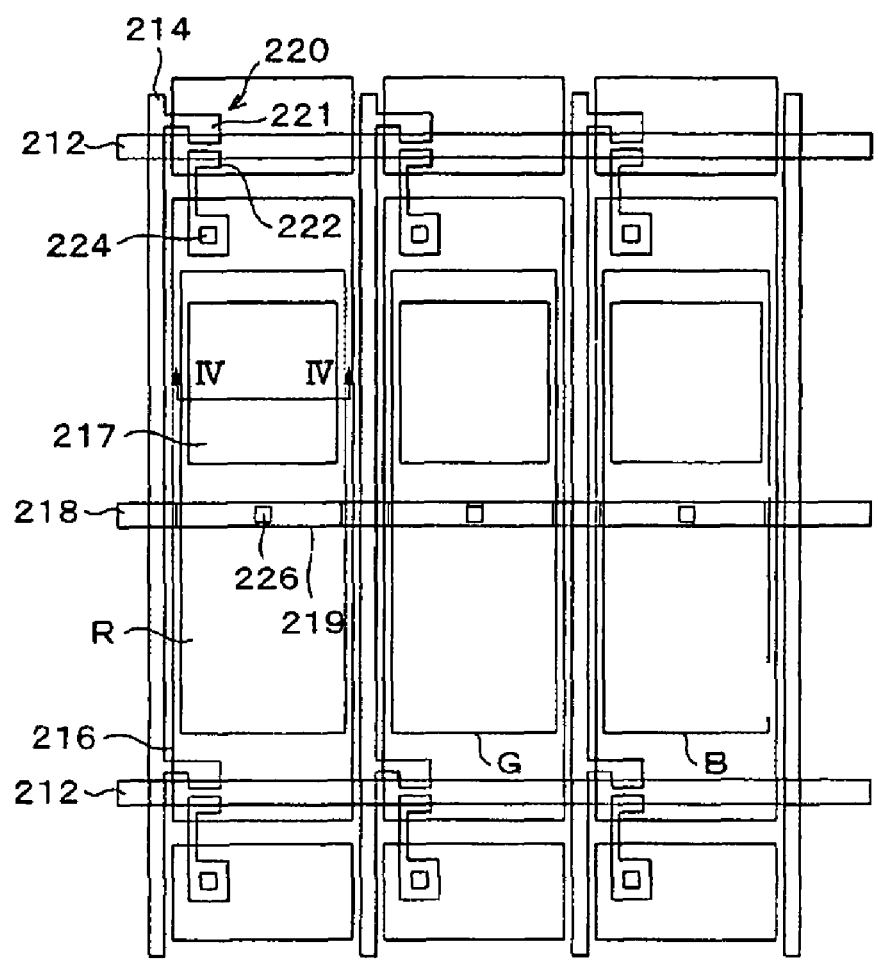
FIGS. 24A and 24B are views showing a structure of a liquid crystal display device according to example 1 of the fourth embodiment of the present invention.
Figure 24B:
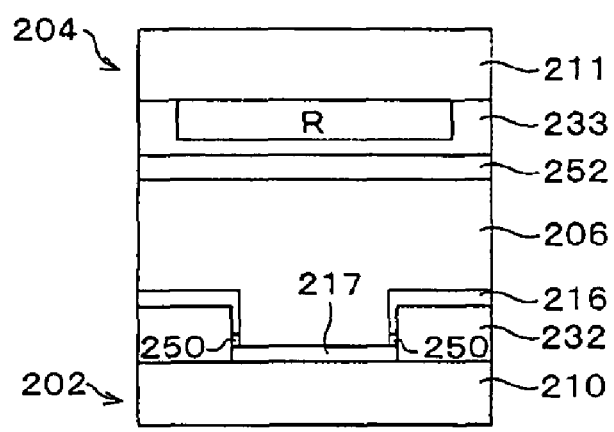

Next, a liquid crystal display device according to example 1 of this embodiment will be explained by use of FIGS. 24A and 24B. FIG. 24A shows a structure of the liquid crystal display device according to example 1, and FIG. 24B shows an outline sectional structure of the liquid crystal display device taken along the line IV-IV of FIG. 24A. As shown in FIGS. 24A and 24B, on the TFT substrate 202 of the liquid crystal display device, a plurality of gate bus lines 212 extending in right and left directions of FIG. 24A in parallel with each other, are formed. In addition, on the TFT substrate 202, a plurality of data bus lines 214, intersecting the gate bus lines 212 via an insulating film (not shown), and extending in the vertical direction of FIG. 24A in parallel with each other, are formed. In the vicinity of each intersection position of the gate bus line 212 and the data bus line 214, a TFT 220 is formed. The TFT 220 has a working semiconductor film (not shown) made of a—Si (amorphous silicon) for example. On the working semiconductor film, a channel protection film (not shown) is formed. On the channel protection film, a drain electrode 221 led out from the adjacent data bus line 214, and a source electrode 222 are formed so as to face each other interposing a predetermined gap therebetween. In this structure, the gate bus lines 212 directly under the channel protection film is adapted to function as a gate electrode of the TFT 220.

In the regions surrounded by the gate bus lines 212 and the data bus lines 214, the reflection electrodes 216 made of Al etc., are formed. The regions where the reflection electrodes 216 are formed serve as reflection regions. The reflection electrodes 216 are electrically connected to the source electrodes 222 via contact holes 224. Parts of the reflection electrodes 216 are opened and transparent electrodes 217 made of ITO etc., are formed therein. The regions where the transparent electrodes 217 are formed serve as transmission regions. The reflection regions and the transmission regions constitute picture element regions. The reflection electrode 216 and the transparent electrode 217 in one picture element are electrically connected via a barrier metal layer 250.

Further, on the TFT substrate 202, storage capacitor bus lines 218, crossing the picture element regions, are formed in parallel to the gate bus lines 212. On the storage capacitor bus lines 218, a storage capacitor electrode 219 is formed for each picture element region. The storage capacitor electrodes 219 are electrically connected to the reflection electrodes 216 via contact holes 226.

On the glass substrate 211 of the CF substrate (counter substrate) 204, any of the CF layers R, G and B for an LCD monitor is formed in part of the reflection regions and in the transmission regions. The CF layers R, G and B are formed with such a film thickness that good color purity can be obtained in the transmission mode display. A flattening film 233 is formed on the entire surface of the substrate on the CF layers R, G and B. A common electrode 252 is formed on the entire surface of the substrate on the flattening film 233.

Figure 25:
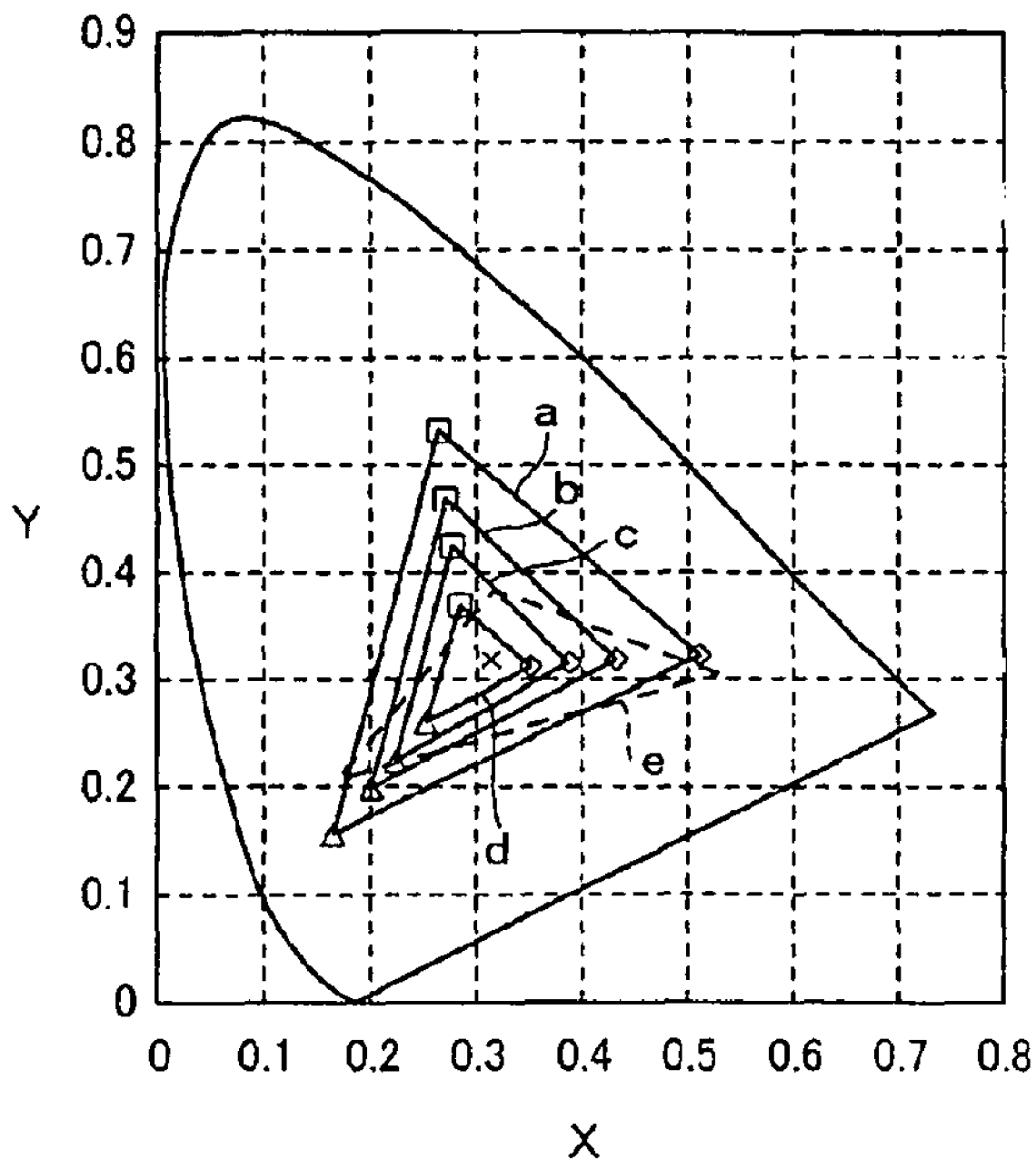
FIG. 25 is an x-y chromaticity chart of the liquid crystal display device according to example 1 of the fourth embodiment of the present invention.

FIG. 25 is an x-y chromaticity chart of the liquid crystal display device of this example 1. A solid line a in the chart shows a color reproducing range (an ideal value) in the reflection mode of the liquid crystal display device in which the area ratio of the region of the reflection regions where the CF layers are formed to the entire reflection regions is 90%. Similarly, a solid line b shows a color reproducing range of the liquid crystal display device having the above-described area ratio of 80% in the reflection mode, a solid line c shows a color reproducing range of the liquid crystal display device having the area ratio of 70% in the reflection mode, and a solid line d shows a color reproducing range of the liquid crystal display device having the above-described area ratio of 50% in the reflection mode. A broken line e shows a color reproducing range (an ideal value) of a conventional reflection type liquid crystal display device in which CF layers having the film thickness of 0.75 μm are used. As shown in FIG. 25, according to example 1, by setting the above-described area ratio to 70% to 90%, a reflection mode display, in which the color reproducing range is wider than that of the conventional reflection type liquid crystal display device, can be obtained. In addition, since the CF layers for an LCD monitor are used in example 1, the same color reproducing range as that of the LCD monitor can be obtained in the transmission mode.

In example 1, similarly to the first basic structure, the CF layers are formed in part of the reflection regions, and in a reflection mode display, the light transmitted through the CF layers twice and the light not transmitted through the CF layers are mixed. Therefore, a display with high luminance can be obtained. Moreover, the area ratio of the region of the reflection regions where the CF layers are formed to the entire reflection regions is adjusted, thereby making the color purity in the reflection mode display closer to the color purity in the transmission mode display. Thus, the transflective type liquid crystal display device with good display quality can be obtained.

Moreover, in example 1, similarly to the first basic structure, even though alignment deviation occurs between the TFT substrate 202 and the counter substrate 204, if the area ratio of the region of the reflection regions where the CF layers are formed to the entire reflection regions is not changed, display characteristics in the reflection mode are not changed. Moreover, if the area ratio of the region of the transmission regions where the CF layers are formed to the entire transmission regions (100% in example 1) is not changed, display characteristics in the transmission mode are not changed. The CF layers are formed in a width wider than that of the transmission regions to prevent the above-described area ratio from changing even when the alignment deviation is generated. Therefore, sufficient alignment margins can be secured, thereby preventing the degradation in the display quality due to the alignment deviation.

Further, in example 1, the reflection electrodes 216 are formed so as to cover the TFTs 220 for driving the adjacent picture elements located on the lower side in FIG. 24A and the gate bus lines 212. Therefore, when a predetermined potential is written in the reflection electrodes 216, voltage is not applied to the gate bus line 212 on the lower side of the reflection electrodes 216. Instead, the voltage is applied to the adjacent gate bus line 212 on the upper side of the reflection electrodes 216. Accordingly, a picture element potential is not affected by an electric field of the gate bus lines 212, and therefore the occurrence of a flicker and a luminance inclination can be prevented.

In example 1, the reflection electrodes 216 are formed so as to cover the TFTs 220 for driving the adjacent picture elements on the lower side, and the gate bus lines 212. However, the reflection electrodes 216 may be formed in the regions surrounded by the gate bus lines 212 and the data bus lines 214. By applying example 1 to the structure of the conventional liquid crystal display device shown in FIG. 1, the liquid crystal display device with good display quality can be obtained.

Figure 2:
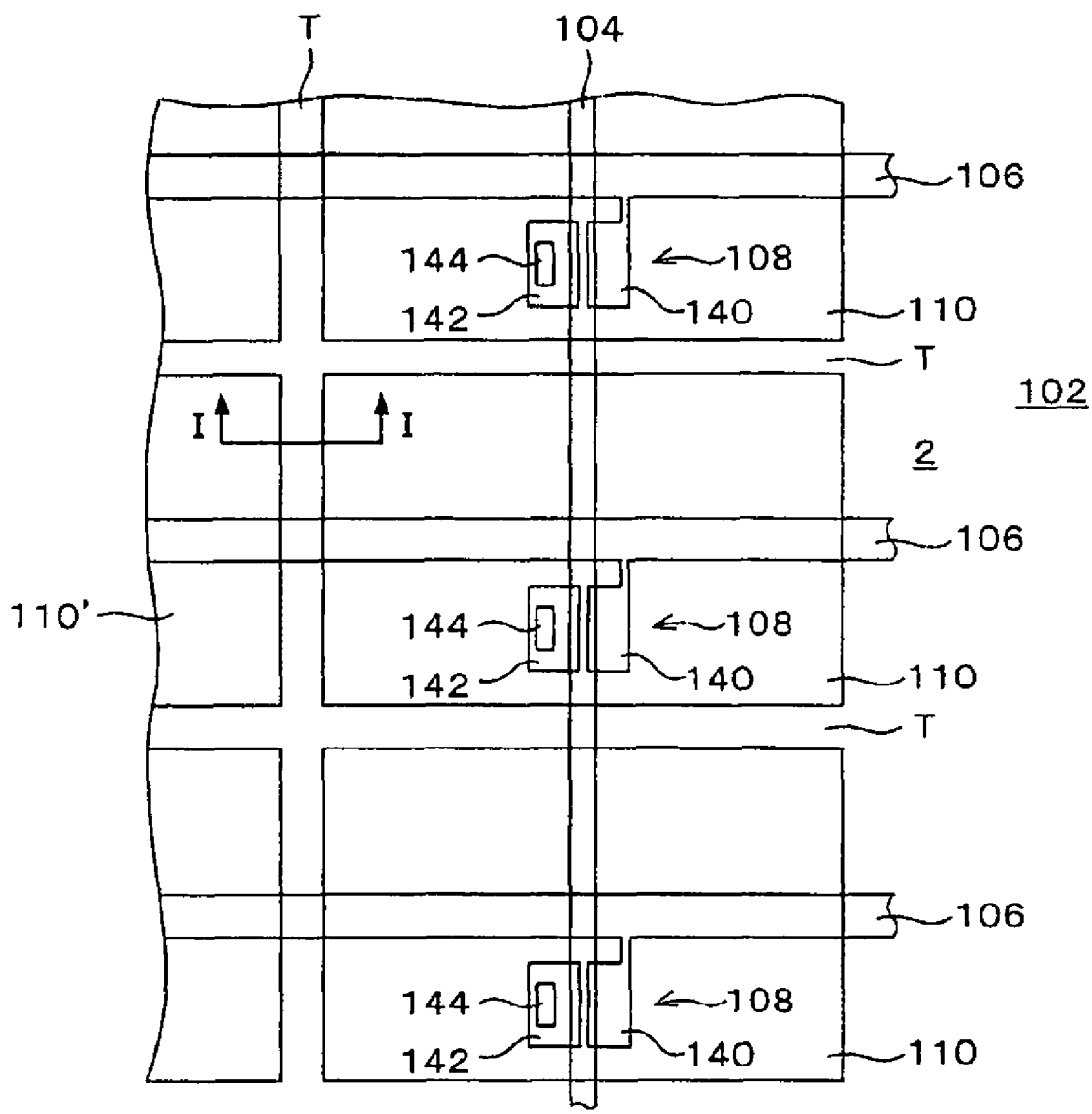
FIG. 2 is a plan view showing a structure of another conventional transflective type liquid crystal display device.
Figure 3:
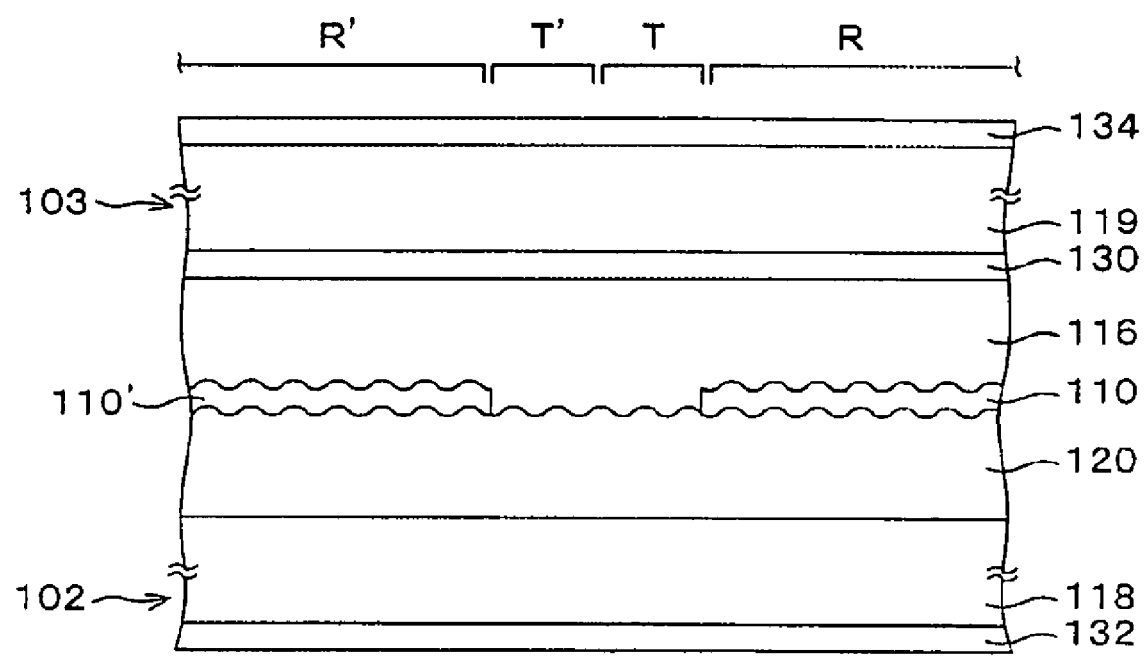
FIG. 3 is a sectional view taken along the line I-I of FIG. 2.
Figure 26A:
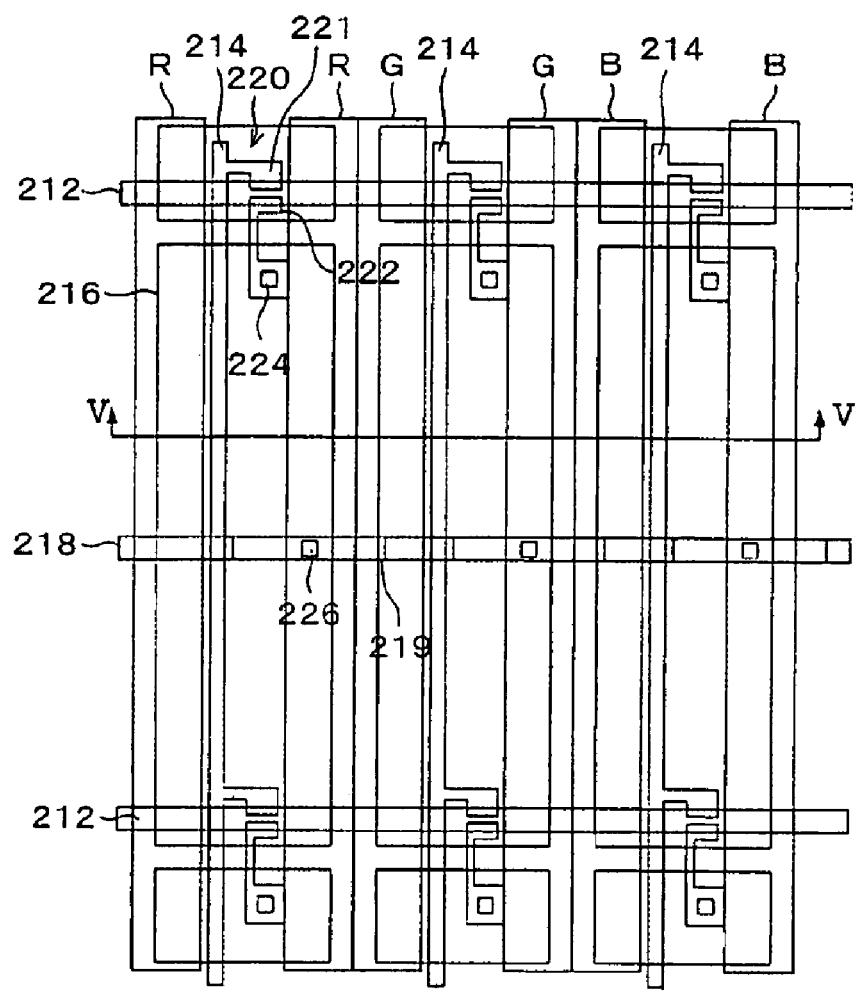
FIGS. 26A and 26B are views showing a structure of a liquid crystal display device according to example 2 of the fourth embodiment of the present invention.
Figure 26B:
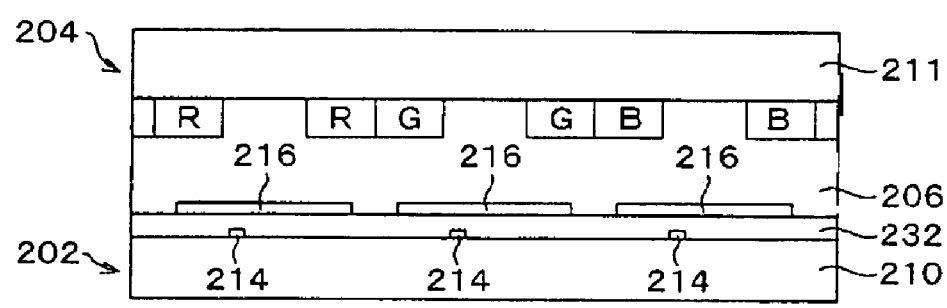

Next, a liquid crystal display device according to example 2 of this embodiment will be explained by use of FIGS. 26A and 26B. FIG. 26A shows a structure of the liquid crystal display device according to this example, and FIG. 26B shows an outline sectional structure of the liquid crystal display device taken along the line V-V of FIG. 26A. As shown in FIGS. 26A and 26B, the reflection electrodes 216 are formed so as to cover the data bus lines 214, the TFTs 220 for driving the adjacent picture elements located on the lower side in FIG. 26A, and the gate bus lines 212. The regions where the reflection electrodes 216 are formed serve as reflection regions. The regions between the adjacent reflection electrodes 216 are used as transmission regions. The liquid crystal 206 in the transmission regions is driven similarly to the liquid crystal 206 in the reflection regions, by an oblique electric field between the reflection electrodes 216 and a common electrode (not shown). In part of the reflection regions and in the transmission regions on the counter substrate 204, any one of the CF layers R, G and B is formed for each picture element. In the example 2 also, the effects similar to those in example 1 can be obtained. In addition, by applying example 2 to the structure of the conventional liquid crystal display device shown in FIGS. 2 and 3, the liquid crystal display device with good display quality can be obtained.

Figure 27A:
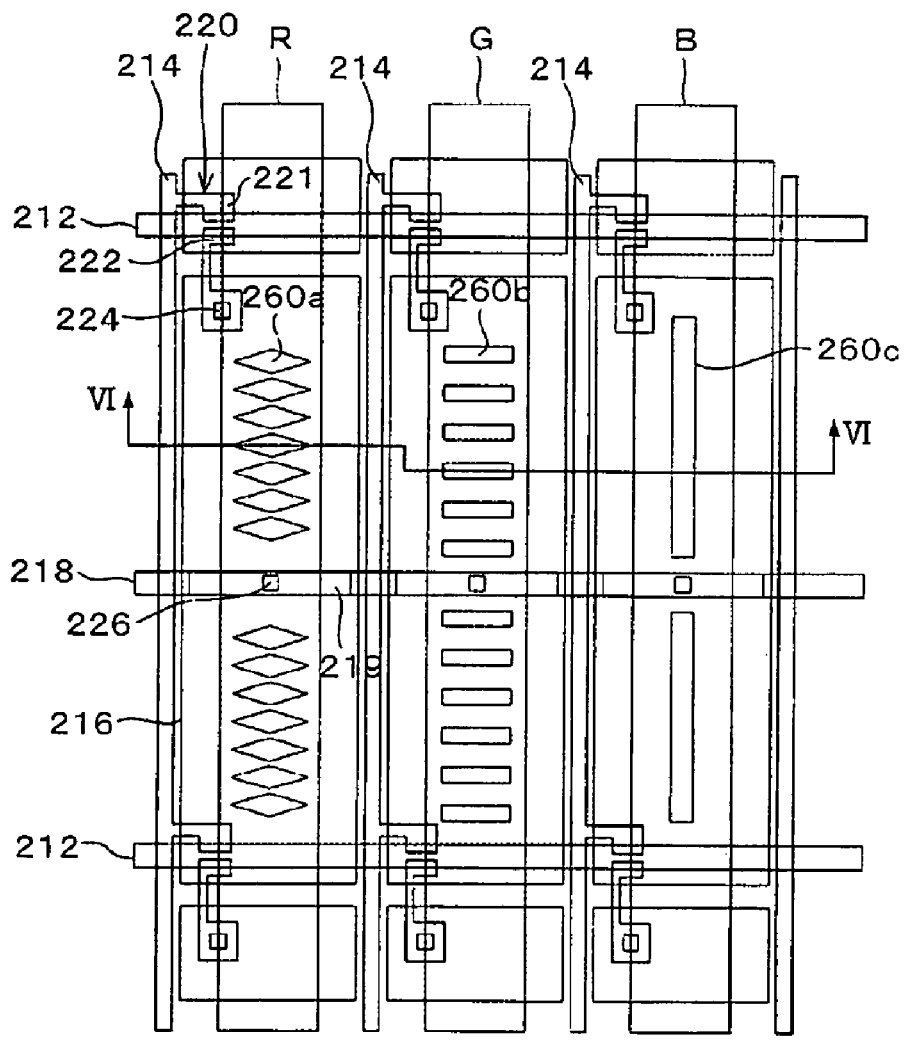
FIGS. 27A and 27B are views showing a structure of a liquid crystal display device according to example 3 of the fourth embodiment of the present invention.
Figure 27B:
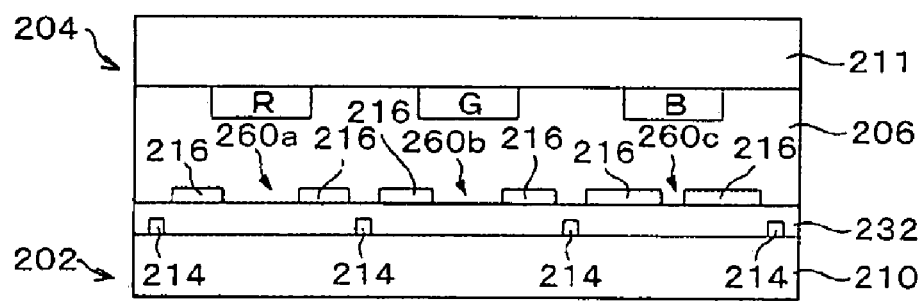

Next, a liquid crystal display device according to example 3 of this embodiment will be explained by use of FIGS. 27A and 27B. FIG. 27A shows a structure of the liquid crystal display device according to example 3, and FIG. 27B shows an outline sectional structure of the liquid crystal display device taken along the line VI-VI of FIG. 27A. As shown in FIGS. 27A and 27B, in the reflection electrodes 216, opening parts 260a to 260c opened in various shapes are formed. For example, in the reflection electrode 216 for the left picture element of three picture elements shown in FIG. 27A, a plurality of diamond-shaped opening parts 260a are formed. Moreover, a plurality of rectangular opening parts 260b having long sides almost in parallel to the extending direction of the gate bus lines 212, are formed in the reflection electrode 216 for the middle picture element of the three picture elements. In the reflection electrode 216 for the right picture element, a plurality of rectangular opening parts 260c having long sides almost in parallel to the extending direction of the data bus lines 214, are formed. The regions where the reflection electrodes 216 are formed serve as reflection regions, and the regions where the opening parts 260a to 260c are formed serve as transmission regions. The liquid crystal 206 in the transmission regions is driven similarly to the liquid crystal 206 in the reflection regions, by an oblique electric field between the reflection electrodes 216 and a common electrode (not shown).

In part of the reflection regions and in the transmission regions on the counter substrate 204, any one of the CF layers R, G and B is formed for each picture element. The reflection electrodes 216 are formed so as to cover the TFTs 220 for driving the adjacent picture elements located on the lower side in FIG. 27A and the gate bus lines 212. According to example 3, the effects similar to those in example 1 and example 2 can be obtained.

Figure 4:
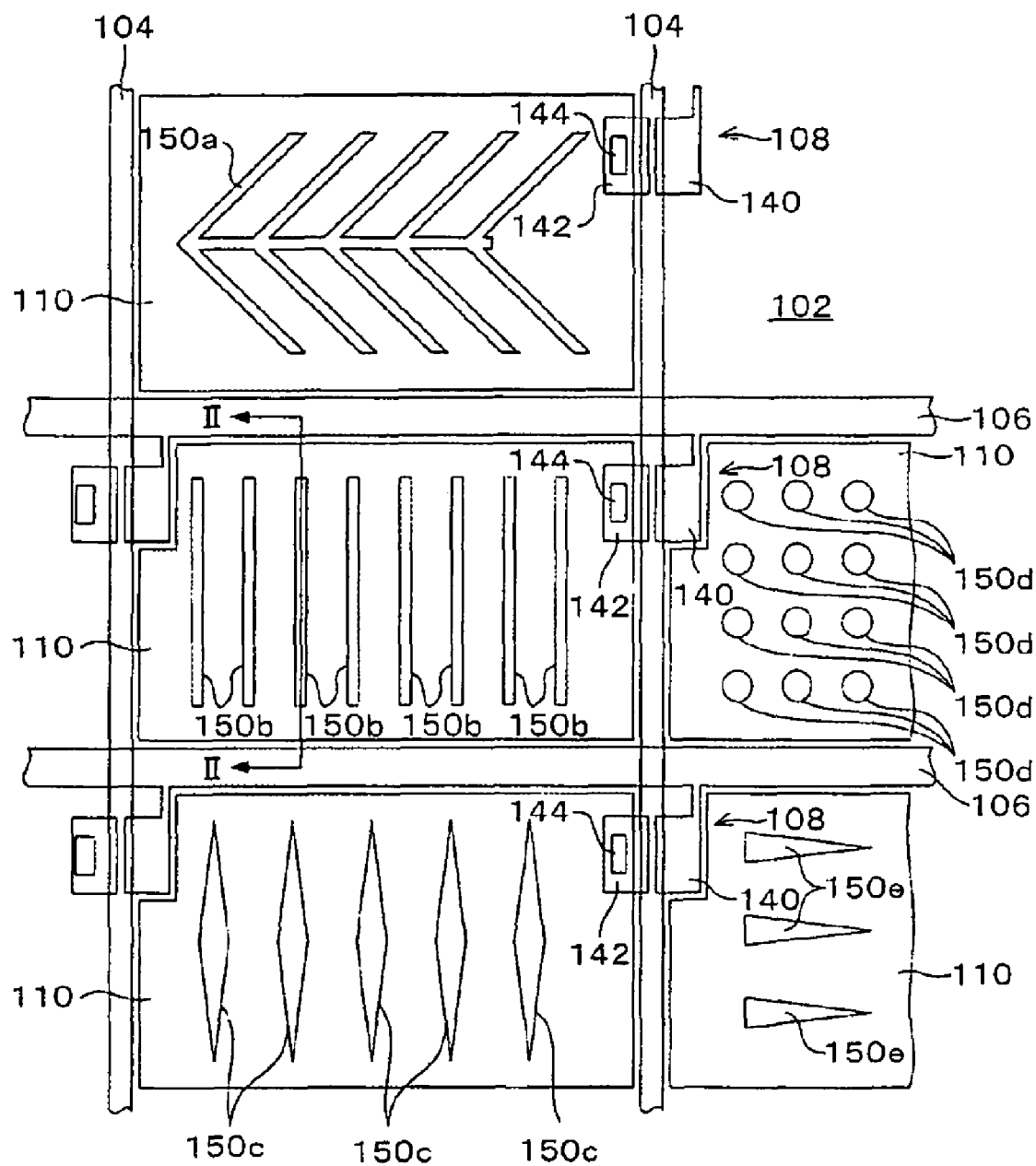
FIG. 4 is a plan view showing a structure of further another conventional transflective type liquid crystal display device.

In example 3, the reflection electrodes 216 are formed so as to cover the TFTs 220 for driving the adjacent picture elements located on the lower side and the gate bus lines 212. However, the reflection electrodes 216 may be formed in the regions surrounded by the gate bus lines 212 and the data bus lines 214. By applying example 3 to the structure of the conventional liquid crystal display device shown in FIG. 4, the liquid crystal display device with good display quality can be obtained.

Figure 28A:
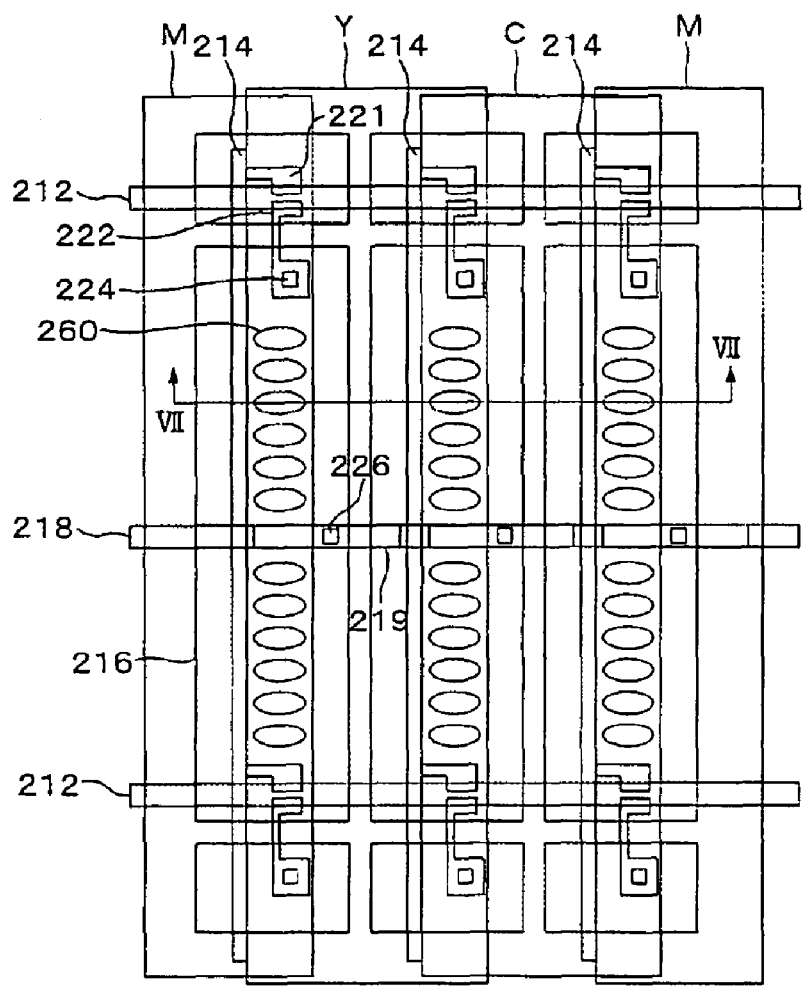
FIGS. 28A and 28B are views showing a structure of a liquid crystal display device according to example 4 of the fourth embodiment of the present invention.
Figure 28B:
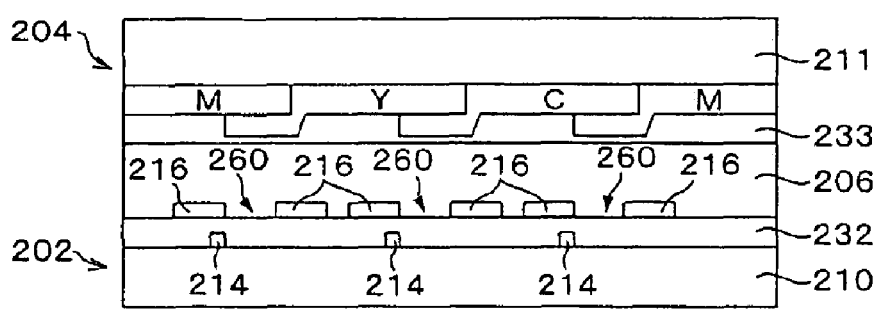

Next, a liquid crystal display device according to example 4 of this embodiment will be explained by use of FIGS. 28A and 28B. FIG. 28A shows a structure of the liquid crystal display device according to example 4, and FIG. 28B shows an outline sectional structure of the liquid crystal display device taken along the line VII-VII of FIG. 28A. As shown in FIGS. 28A and 28B, the reflection electrodes 216 are formed so as to cover the gate bus lines 212, the data bus lines 214, and the TFTs 220. In the reflection electrodes 216, a plurality of opening parts 260 opened in a nearly elliptical shape are formed. The regions where the opening parts 260 are formed serve as transmission regions T1. The regions where the reflection electrodes 216 are formed serve as reflection regions. Moreover, the regions where the opening parts 260 are formed and the regions between the adjacent reflection electrodes 216 serve as transmission regions. The liquid crystal 206 in the transmission regions is driven similarly to the liquid crystal 206 in the reflection regions, by an oblique electric field between the reflection electrodes 216 and a common electrode (not shown).

Figure 5:
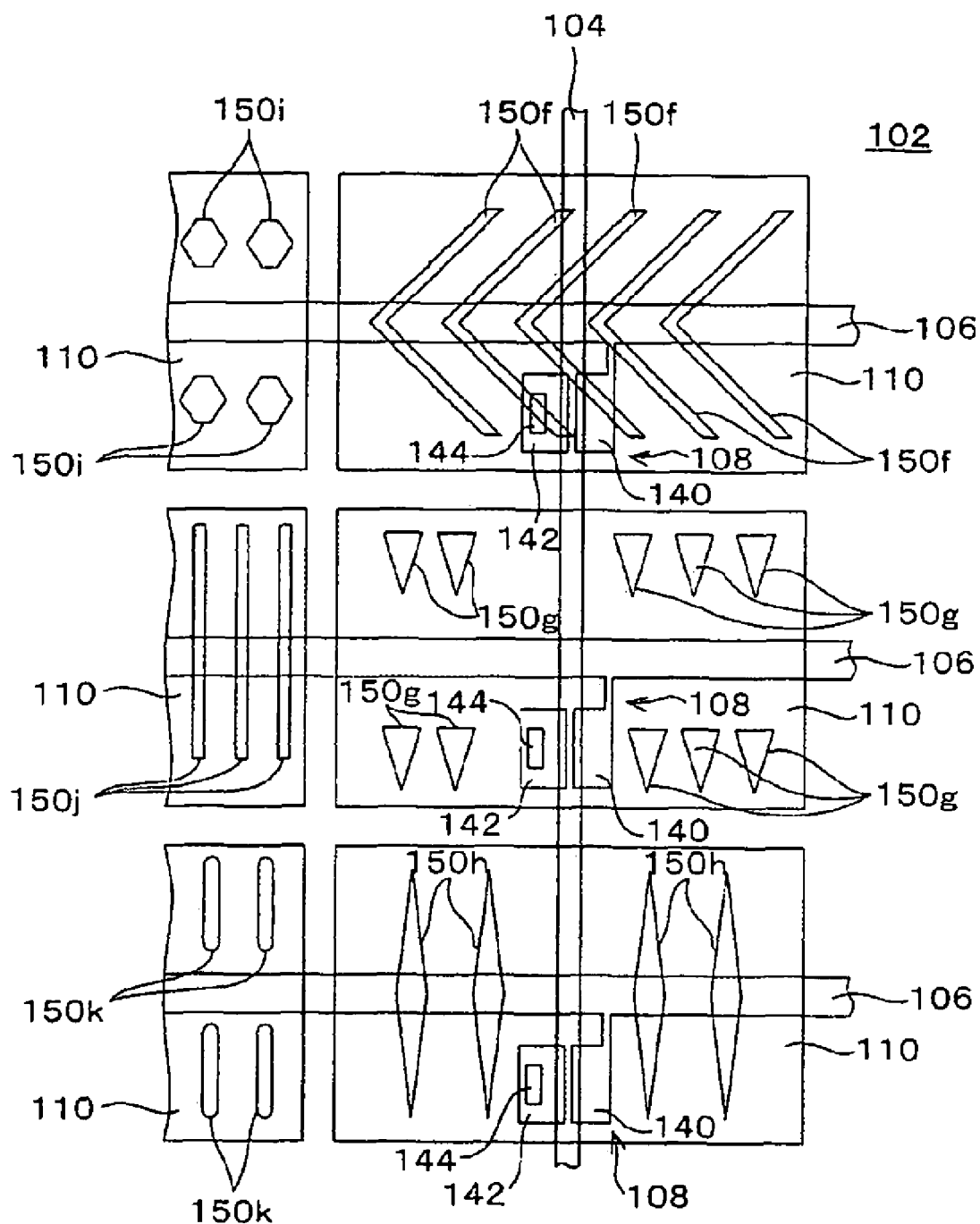
FIG. 5 is a plan view showing a structure of still another conventional transflective type liquid crystal display device.
Figure 6:
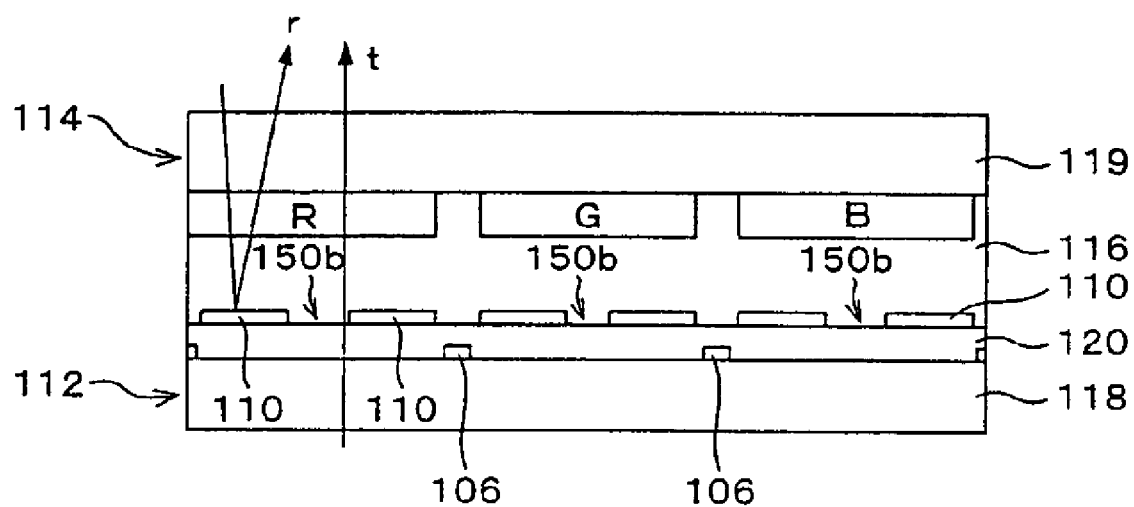
FIG. 6 is a sectional view explaining about a problem of a conventional liquid crystal display device.

The counter substrate 204 have the CF layers C, M and Y for transmitting the light having the wavelengths of C, M and Y which are complementary colors of R, G and B. The CF layers C, M, and Y constitute layered parts where two layers are laminated, in part of the reflection regions and in the transmission regions. Moreover, the CF layers C, M, and Y constitute single layer parts having only one layer in the other regions. In the transmission region of a picture element displaying R, two layers of the CF layers M and Y are laminated. In the transmission region of a picture element displaying G, two layers of the CF layers Y and C are laminated. In the transmission region of a picture element displaying B, two layers of the CF layers C and M are laminated. On the CF layers C, M, and Y, the flattening film 233 is formed. According to the example 4, the effects similar to those in example 1 to example 3 can be obtained. In addition, since the flattening film 233 is formed on the CF layers C, M, and Y, orientation stability of the liquid crystal 206 can be improved similarly to the third basic structure. Moreover, by applying example 4 to the structure of the conventional liquid crystal display device shown in FIG. 5, the liquid crystal display device with good display quality can be obtained.

As described above, according to this embodiment, the liquid crystal display device having high utilization efficiency of light and good display quality can be achieved at low cost.

Fifth Embodiment

Figure 29:
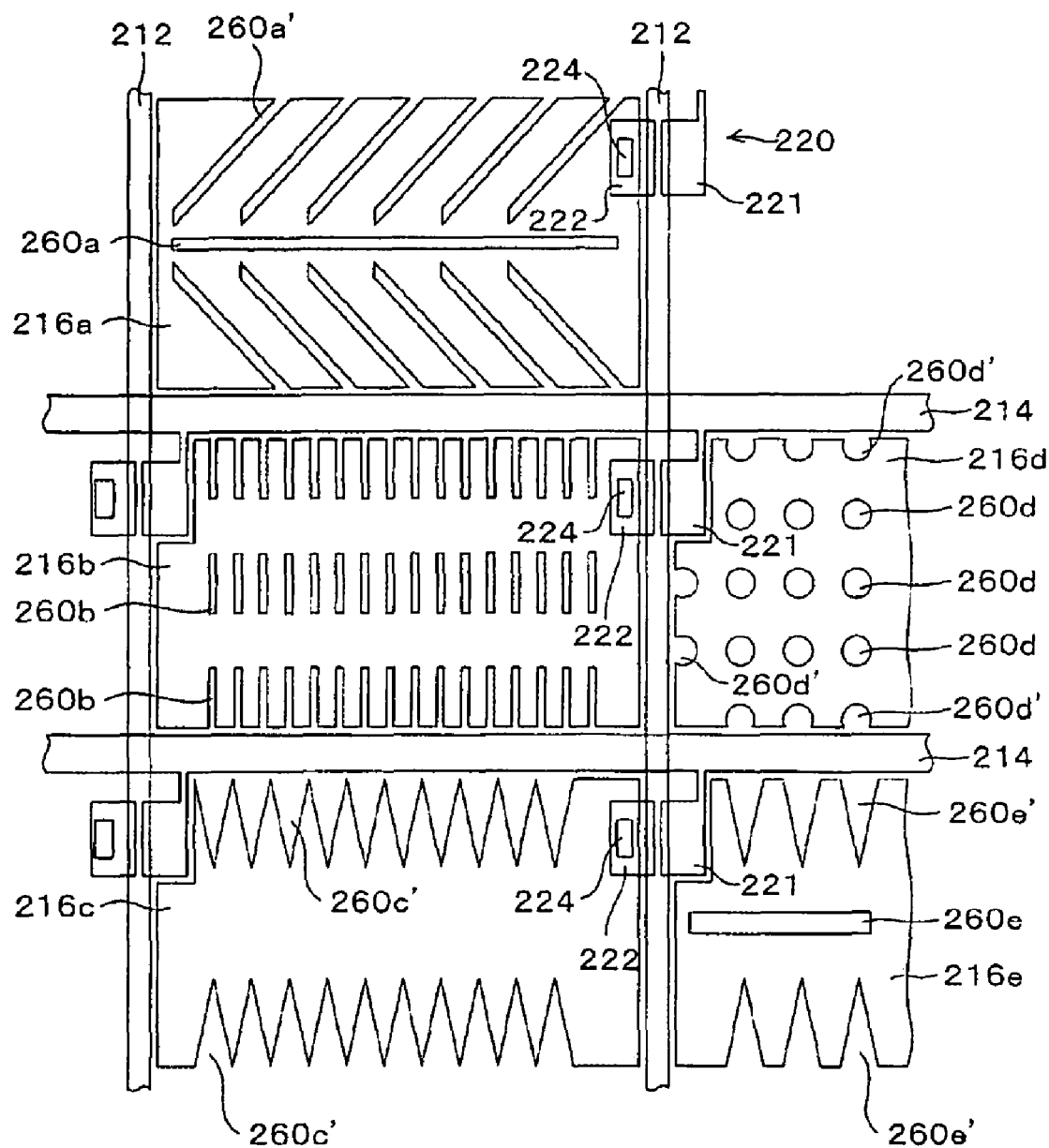
FIG. 29 is a view showing a structure of a liquid crystal display device according to a fifth embodiment of the present invention.

Next, a liquid crystal display device according to the fifth embodiment of the present invention will be explained by use of FIGS. 29 and 30. FIG. 29 shows a structure of the liquid crystal display device according to this embodiment. Note that constituent components functioning similarly to those of the liquid crystal display device according to the fourth embodiment are designated by the same numerals and symbols, and explanation thereof is omitted. As shown in FIG. 29, the reflection electrodes 216a to 216e constituting the reflection regions of the transflective type liquid crystal display device are formed in the regions partitioned by the gate bus lines 212 and the data bus lines 214. In the reflection electrodes 216a, 216b, 216d, and 216e, opening parts 260a, 260b, 260d, and 260e, opened in various shapes such as a slit-like shape and a circular hole-like shape, are respectively formed.

Further, in the peripheral parts of the reflection electrodes 216a to 216e, notched parts 260a' to 260e', cut into various shapes such as a slit-like shape and a circular or polygonal hole-like shape, are respectively formed.

For example, in the reflection electrode 216a, one slit-shaped opening part 260a extending almost in parallel to the long sides of the reflection electrode 216a, and slit-shaped notched parts 260a' cut inside from the two opposing long sides of the reflection electrode 216a and extending obliquely to both the long sides, are formed. In the reflection electrode 216b, a plurality of slit-shaped opening parts 260b extending almost in parallel to the short sides of the reflection electrode 216b, and a plurality of slit-shaped notched parts 260b' cut inside from both the long sides of the reflection electrode 216b and extending almost in parallel to the short sides of the reflection electrode 216b, are formed. In the reflection electrode 216c, a plurality of wedge-like notched parts 260c' cut from both the long sides of the reflection electrode 216c and extending almost in parallel to the short sides of the reflection electrode 216c, are mutually adjacently formed. In the reflection electrode 216d, a plurality of circular opening parts 260d, and a plurality of circular notched parts 260d' cut from both the short sides and both the long sides of the reflection electrode 216d, are formed. In the reflection electrode 216e, one slit-shaped opening part 260e extending almost in parallel to the long sides of the reflection electrode 216e, and a plurality of wedge-like notched parts 260e' cut from both the long sides of the reflection electrode 216e and extending almost in parallel to the short sides of the reflection electrode 216e, are formed.

The regions where the reflection electrodes 216a to 216e are formed serve as reflection regions. The regions where the opening parts 260a, 260b, 260d, and 260e are formed, and the regions where the notched parts 260a' to 260e' of the peripheral parts of the reflection electrodes 216a to 216e serve as transmission regions. No transparent electrodes are formed in the opening parts 260a, 260b, 260d, and 260e, and in the notched parts 260a' to 260e'. Liquid crystal molecules in the transmission regions are driven almost similarly to the liquid crystal molecules in the reflection regions of the same picture element, by an oblique electric field between end portions of the reflection electrodes 216a to 216e and a common electrode 252 (not shown in FIG. 29) on a counter substrates 204 side.

In FIG. 29, the opening parts 260a, 260b, 260d, and 260e and the notched parts 260a' to 260e' are formed in different shapes for each picture element. However, all of the opening parts 260a, 260b, 260d, and 260e and the notched parts 260a' to 260e' may be formed in the same shapes for each picture element. In addition, each opening part 260a, 260b, 260d, and 260e and each notched part 260a' to 260e' may have a shape to restrict the alignment of the liquid crystal molecules. With this structure, in the liquid crystal display device of VA mode in which the liquid crystal molecules are aligned almost perpendicular to the substrates, alignment division dispensing with rubbing treatment of an alignment layer is enabled. Note that although rubbing treatment is required, this embodiment is applicable to the liquid crystal display devices of TN mode in which a horizontally aligned layer is used, and of HAN (Hybrid Aligned Nematic) mode in which horizontally aligned layer and vertically aligned layer are used. According to this embodiment, good transmission characteristics can be obtained compared with the conventional transflective type liquid crystal display device shown in FIG. 4.

Figure 30:
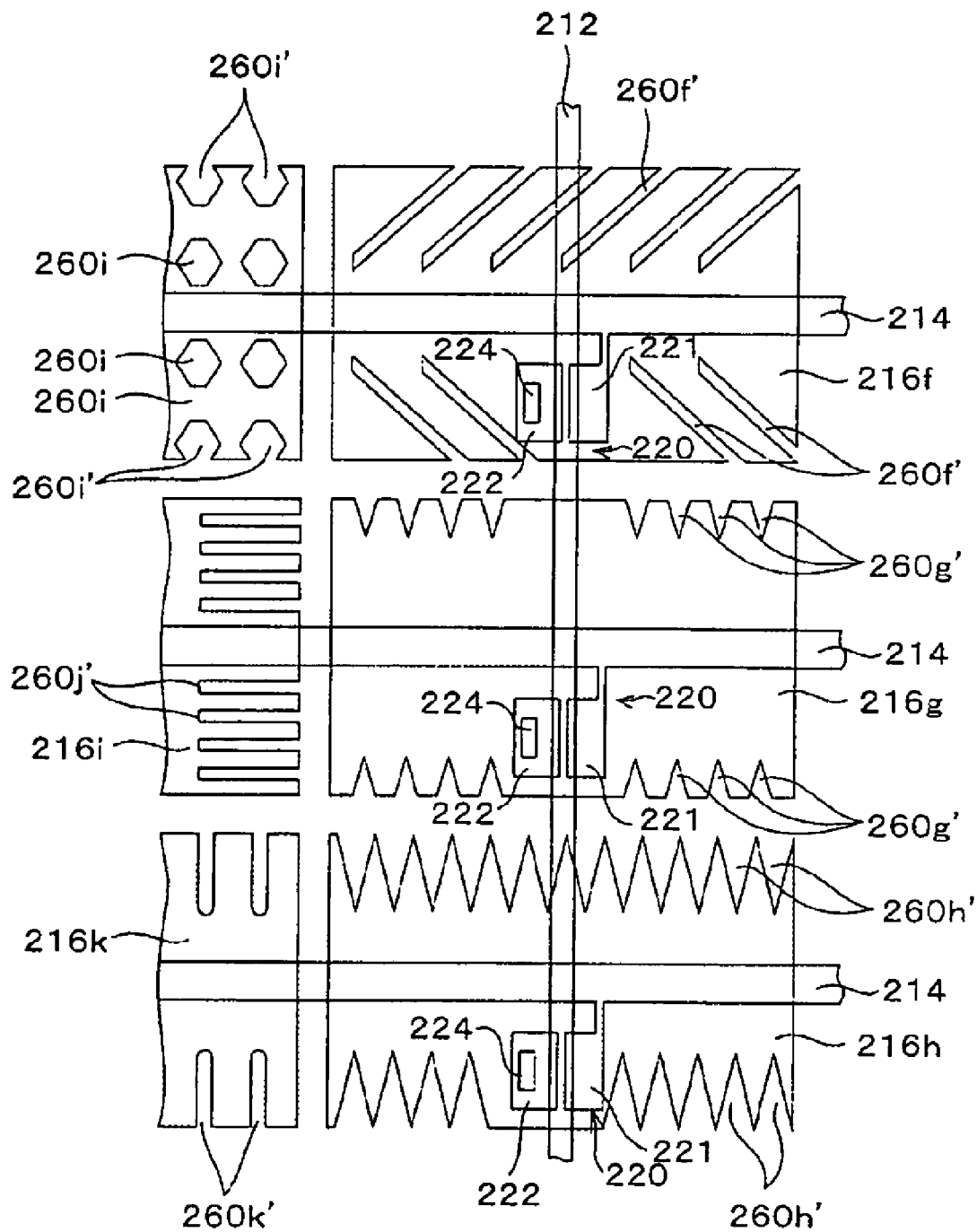
FIG. 30 is a view showing a modified example of the structure of the liquid crystal display device according to the fifth embodiment of the present invention.

FIG. 30 shows a modified example of the structure of the liquid crystal display device according to this embodiment. As shown in FIG. 30, reflection electrodes 216f to 216k are formed at intersection positions of both bus lines 212 and 214 and on the upper layer of the TFTs 220. Moreover, in the reflection electrodes 216f to 216k, various-shaped opening parts 260i and notched parts 260f' to 260k' are formed.

For example, in the reflection electrode 216f, a plurality of the notched parts 260f' cut from both the long sides and one of the short sides of the reflection electrode 216f and extending obliquely to the long sides of the reflection electrode 216f, are formed. In the reflection electrode 216g, a plurality of the triangular notched parts 260g' cut from both the long sides of the reflection electrode 216g are formed. In the reflection electrode 216h, a plurality of the wedge-like notched parts 260h' cut from both the long sides of the reflection electrode 216h and extending in parallel to the short sides of the reflection electrode 216h are mutually adjacently formed. In the reflection electrode 216i, a plurality of the hexagonal opening parts 260i and a plurality of the hexagonal notched parts 260i' cut from both the long sides of the reflection electrode 216i, are formed. In the reflection electrode 216j, a plurality of the slit-shaped notched parts 260j' cut from the short sides of the reflection electrode 216j and extending almost in parallel to the long sides of the reflection electrode 216j, are formed. In the reflection electrode 216k, a plurality of the slit-shaped notched parts 260k' cut from both the long sides of the reflection electrode 216k and extending almost in parallel to the short sides of the reflection electrode 216k, are formed. Tip end portions of the notched parts 260k' are formed into arcuate roundness.

The regions where the reflection electrodes 216f to 216k are formed serve as reflection regions. The regions where the opening parts 260i are formed, the regions where the notched parts 260f' to 260k' of the peripheral parts of the reflection electrodes 216f to 216k are formed, and the regions around the reflection electrodes 216f to 216k, serve as transmission regions. According to this modified example, good transmission characteristics can be obtained compared with the conventional transflective type liquid crystal display device shown in FIG. 5.

The present invention is not limited to the above-described fourth to fifth embodiments and can be variously modified.

For example, in the above embodiments, the bottom gate type substrate for a liquid crystal display device was exemplified. However, the present invention is not limited thereto and applicable also to a top gate type substrate for a liquid crystal display device.

Moreover, in the above fourth to fifth embodiments, the channel protection film type substrate for a liquid crystal display device was exemplified. However, the present invention is not limited thereto and applicable also to a channel etch type substrate for a liquid crystal display device.

Further, in the above fourth to fifth embodiments, the active matrix type liquid crystal display device was exemplified. However, the present invention is not limited thereto and applicable also to a simple matrix type liquid crystal display device.

Furthermore, in the above fourth to fifth embodiments, the liquid crystal display device having the CF layers formed on the counter substrate 204 opposingly arranged to the TFT substrate 202, was exemplified. However, the present invention is not limited thereto and applicable also to a liquid crystal display device having a so-called CF-on-TFT structure, in which the CF layers are formed on the TFT substrate 202.

Further, in the above fourth to fifth embodiments, the liquid crystal display device of VA mode was exemplified. However, the present invention is not limited thereto and applicable also to other liquid crystal display devices of MVA (Multi-domain Vertical Alignment) mode, TN mode, HAN mode and the like.

In addition, in the above fourth to fifth embodiments, the CF layers were exemplified as wavelength selecting layers. However, the present invention is not limited thereto, and a cholesteric liquid crystal or the like in which the light of a specific wavelength is selectively reflected, may be used as a wavelength selecting layer.

The present invention is applicable to a MVA (Multi-domain Vertical Alignment) type liquid crystal display. In this case, a slit functions as a structure for a multi-domain. When voltage is impressed, the liquid crystal molecules of the both side of a slit incline in the different direction. Thereby, a multi-domain is attained. It is not necessary to rubbing, which can simplify the fabrication process.

What is claimed is:

1. A liquid crystal display device constituted by enclosing liquid crystal between a pair of substrates, comprising:
    on one of the pair of substrates, gate bus lines supplied with scanning signals;
    data bus lines supplied with display signals;
    thin-film transistors having gate electrodes electrically connected to the gate bus lines and drain electrodes electrically connected to the data bus lines;
    a resin film divided for each picture element and disposed on upper part of the gate bus lines, the data bus lines, and the thin-film transistors; and
    reflection electrodes formed on the resin film and electrically connected to source electrodes of the thin-film transistors,
    wherein regions between adjacent reflection electrodes serve as first light transmission regions, and transparent electrodes, which are electrically connected to the reflection electrodes, are not disposed in the first light transmission regions.

2. The liquid crystal display device according to claim 1, wherein the resin film is formed of a positive type photoresist.

3. The liquid crystal display device according to claim 1, wherein the resin film and the reflection electrode are divided into a plurality of regions by a slit in one picture element to serve a region in which the slit is provided as a second light transmission region.

4. A manufacturing method for a liquid crystal display device comprising the steps of:
    forming on a first substrate gate bus lines supplied with scanning signals, data bus lines supplied with display signals, thin-film transistors having gate electrodes connected to the gate bus lines and drain electrodes connected to the data bus lines;
    forming a photoresist film on upper part of the gate bus lines, the data bus lines, and the thin-film transistors;
    dividing the photoresist film for each reflection electrode forming region overlapping with the gate bus lines, the data bus lines, and the thin-film transistors, and exposing and developing photoresist to form opening parts at positions corresponding to source electrodes of the thin-film transistors;
    forming on the photoresist film reflection electrodes electrically connected to the source electrodes of the thin-film transistors via the opening parts to set regions between the adjacent reflection electrodes as light transmission regions; and
    arranging opposingly the first substrate and a second substrate provided with an electrode made of a transparent conductive film, and enclosing liquid crystal therebetween,
    wherein transparent electrodes, which are electrically connected to the reflection electrodes, are not formed in the light transmission regions.

5. The manufacturing method for the liquid crystal display device according to claim 4, wherein a structure for multi-domain is formed at least on one of the substrates.

* * * * *